United States Patent
Kimoto

(10) Patent No.: US 10,601,736 B2
(45) Date of Patent: Mar. 24, 2020

(54) REPEATER TRANSMISSION PERFORMANCE IMPROVEMENT REGARDLESS OF NUMBER OF BUFFERS

(71) Applicant: NEC Corporation, Minato-ku, Tokyo (JP)

(72) Inventor: Kei Kimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/034,465

(22) Filed: Jul. 13, 2018

(65) Prior Publication Data

US 2019/0036847 A1    Jan. 31, 2019

(30) Foreign Application Priority Data

Jul. 27, 2017 (JP) .................................. 2017-145108

(51) Int. Cl.
| | | |
|---|---|---|
| H04L 12/861 | (2013.01) | |
| H04L 12/863 | (2013.01) | |
| H04L 12/937 | (2013.01) | |
| H04L 12/935 | (2013.01) | |

(52) U.S. Cl.
CPC .......... *H04L 49/90* (2013.01); *H04L 47/6225* (2013.01); *H04L 49/254* (2013.01); *H04L 49/3018* (2013.01); *H04L 49/3027* (2013.01)

(58) Field of Classification Search
CPC ............... H04L 47/6225; H04L 49/254; H04L 49/3018; H04L 49/3027; H04L 49/90
USPC ......................................... 370/412, 413, 414
See application file for complete search history.

(56) References Cited

U.S. PATENT DOCUMENTS

| | | | | |
|---|---|---|---|---|
| 5,872,783 A | * | 2/1999 | Chin ................... | H04L 49/3009 370/395.32 |
| 2002/0191641 A1 | * | 12/2002 | Lhermitte ............. | H04J 3/1682 370/468 |
| 2009/0185575 A1 | * | 7/2009 | Iwata ...................... | H04L 49/25 370/422 |
| 2012/0072635 A1 | | 3/2012 | Yoshida et al. | |

FOREIGN PATENT DOCUMENTS

WO    2012/029215 A1    3/2012

* cited by examiner

*Primary Examiner* — Melvin C Marcelo
*Assistant Examiner* — Natali Pascual Peguero

(57) ABSTRACT

A repeater includes input ports for inputting packets from modules, input buffers configured to store the input packets, output ports for outputting packets to modules, output buffers configured to store the packets before output, a switch connected between the input buffers and the output buffers, and a controller. The controller selects any of the input buffers, acquires any of the packets from the selected input buffer, and based on a result of comparison between a destination of a packet previously transferred to the output buffer corresponding to the destination of the acquired packet and the destination of the acquired packet and on the availability of the output buffer, determines propriety of transfer of the acquired packet. The controller controls the switch to transfer the packet determined to be transferable, from the input buffer to the output buffer.

11 Claims, 27 Drawing Sheets

REPEATER TRANSMISSION PERFORMANCE IMPROVEMENT REGARDLESS OF NUMBER OF BUFFERS

INCORPORATION BY REFERENCE

The present invention is based upon and claims the benefit of priority from Japanese patent application No. 2017-145108, filed on Jul. 27, 2017, the disclosure of which is incorporated herein in its entirety by reference.

TECHNICAL FIELD

The present invention relates to a repeater, a repeating method, and a network-on-chip device.

BACKGROUND ART

LSI design recently adopts a network-on-chip technology in which modules such as cores (processor cores), memories, and routers (repeaters) are connected by routers and transmission lines (channels).

Each router on such a network-on-chip includes an input port, an output port, an input buffer, and an output buffer for each module connected with the router. The router also includes an arbitration device configured to transfer a packet from an input buffer to an output buffer. When a packet is input to a router from a module connected with the router via an input port, the router temporarily stores the input packet in an input buffer. When a packet exists in the input buffer, the arbitration device performs packet arbitration, and transfers the packet in the input buffer to an output buffer corresponding to an output port determined based on the destination of the packet. When a packet exists in the corresponding output buffer, the output port transmits the packet in the output buffer to a transmission line connected with the output port.

In such a router on network-on-chip, it is known that when the input buffer is occupied by packets addressed to the same destination, transmission performance of the router deteriorates.

In order to solve the aforementioned problem, a router including a destination comparing section and an output section has been proposed as first related art of the present invention (see WO 2012/029215 A (Patent Literature 1), for example). The destination comparing section determines the order of allocation of virtual channels of the destination router in data units stored in respective virtual channels, according to whether or not the destinations are the same. The output section outputs stored data units from virtual channels to which allocation of the virtual channels of the destination router is determined. According to the first related art, the source router is able to transmit packets to the destination router such that packets having different destinations are uniformly stored in a plurality of virtual channels of the destination router. As such, in the destination router, it is possible to prevent a state where all virtual channels are occupied by the packets of the same destination. Here, the actual body of a virtual channel is a buffer of the router. This means that having a plurality of virtual channels for each input port means that a plurality of buffers are provided to each input port, and that processing is performed to transmit a plurality of packets having different destinations in parallel for each input port.

Patent Literature 1: WO 2012/029215 A

However, in the case of a network-on-chip, a router causes overhead. Therefore, it is necessary to make the router area small. Accordingly, it is likely that the number of buffers for each input port of the router is reduced. There is a case where each input port has only one buffer. The first related art of the present invention includes a destination comparing section that determines the order of allocation of virtual channels of the destination router of data units stored in a plurality of virtual channels. Accordingly, it is not applicable to a router in which there is only a single virtual channel, that is, a router in which the number of buffers for each input port is one. Accordingly, it is difficult to improve the transmission performance of a router regardless of the number of buffers of each input port.

SUMMARY

An exemplary object of the present invention is to provide a router capable of solving the aforementioned problem, that is, a problem that it is difficult to improve transmission performance of a router regardless of the number of buffers.

A repeater according to an exemplary aspect of the present invention includes a plurality of input ports for inputting packets from a plurality of modules, a plurality of input buffers configured to store the packets input from the input ports, a plurality of output ports for outputting packets to the modules, a plurality of output buffers configured to store the packets before output from the output ports, a switch connected between the input buffers and the output buffers, and a controller. The controller is configured to select any of the input buffers, acquire any of the packets from the selected input buffer, and based on a result of comparison between the destination of a packet previously transferred to the output buffer corresponding to the destination of the acquired packet and the destination of the acquired packet and on availability of the output buffer, determine propriety of transfer of the acquired packet, and control the switch to transfer the packet determined to be transferable, from the input buffer to the output buffer.

A repeating method according to another exemplary aspect of the present invention is a method of inputting a plurality of packets from a plurality of modules via a plurality of input ports, and outputting the plurality of the packets to the plurality of the modules via a plurality of output ports. The method includes inputting the plurality of the packets from the plurality of the input ports and storing the packets in a plurality of input buffers, selecting any of the input buffers, acquiring any of the packets from the selected input buffer, based on a result of comparison between the destination of a packet previously transferred to an output buffer, among the plurality of the output buffers, corresponding to the destination of the acquired packet and the destination of the acquired packet, and based on availability of the output buffer, determining propriety of transfer of the acquired packet to the output buffer, transferring the packet determined to be transferable, from the input buffer to the output buffer, and acquiring the packet from the output buffer, and outputting the packet to the module via the output port.

A network-on-chip device according to another exemplary aspect of the present invention includes a plurality of repeaters, a plurality of modules, and a plurality of transmission lines connecting two of the repeaters adjacent to each other and connecting the repeater and the module adjacent to the repeater.

Each of the repeaters includes a plurality of input ports for inputting packets from a plurality of adjacent modules, a plurality of input buffers configured to store the packets input from the input ports, a plurality of output ports for outputting packets to adjacent modules, a plurality of output buffers configured to store the packets before output from the output ports, a switch connected between the input buffers and the output buffers, and a controller. The controller is configured to select any of the input buffers, acquire any of the packets from the selected input buffer, and based on a result of comparison between the destination of a packet previously transferred to the output buffer corresponding to the destination of the acquired packet and the destination of the acquired packet and on availability of the output buffer, determine propriety of transfer of the acquired packet, and control the switch to transfer the packet determined to be transferable, from the input buffer to the output buffer.

With the configurations described above, the present invention is able to improve the transmission performance of a router regardless of the number of buffers.

EXEMPLARY EMBODIMENTS

Next, embodiments of the present invention will be described in detail with reference to the drawings.

[First Exemplary Embodiment]

Figure 1:
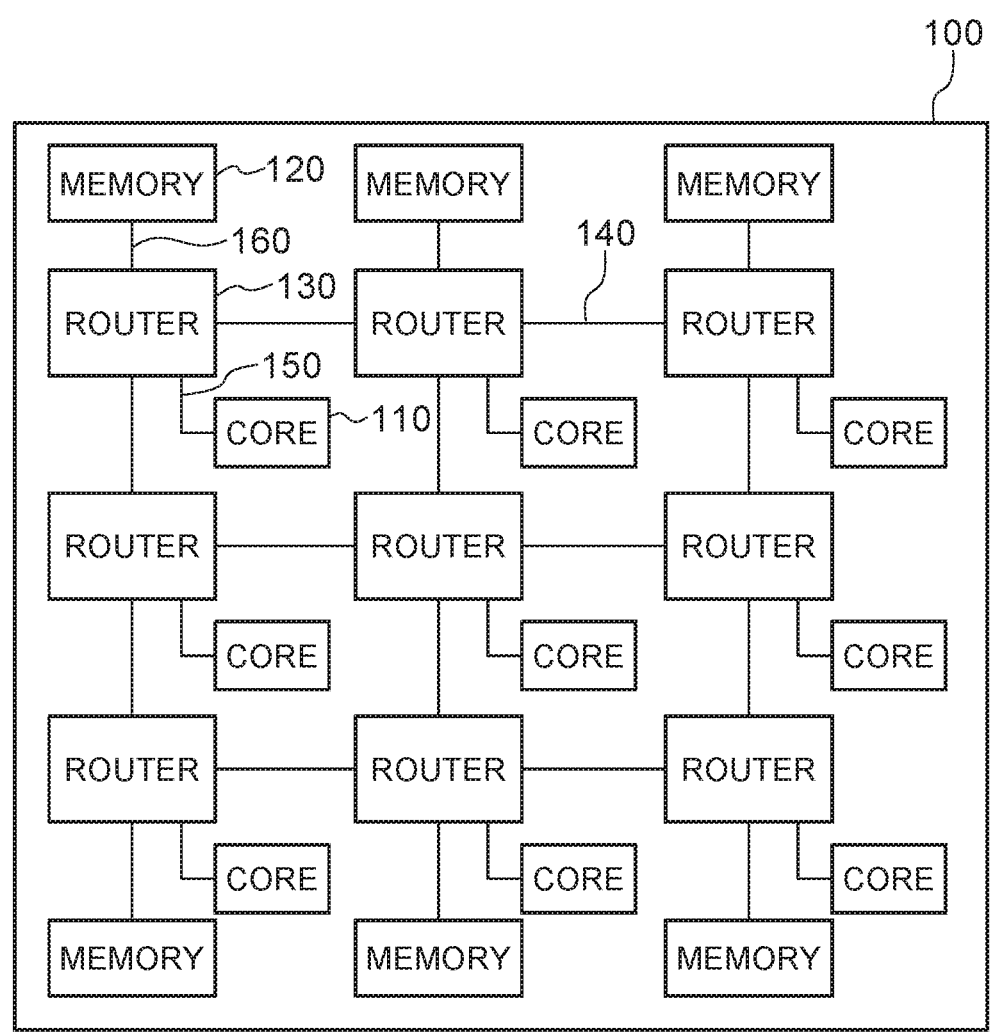
FIG. 1 is a diagram illustrating an exemplary hardware configuration of an LSI chip according to a first exemplary embodiment of the present invention.

FIG. 1 illustrates an exemplary hardware configuration of an LSI chip 100 according to a first exemplary embodiment of the present invention. Referring to FIG. 1, the LSI chip 100 is a network-on-chip device having a mesh-type topology in which a plurality of routers 130 are arranged in a lattice pattern and are connected with each other via a plurality of transmission lines 140. Each of the routers 130 of the LSI chip 100 is connected with a core (processor core) 110 via a transmission line 150. Further, some routers 130 of the LSI chip 100 each are connected with memories 120 via transmission lines 160. It should be noted that the present invention is not only applicable to a network-on-chip device having a mesh-type topology. The present invention is also applicable to a network-on-chip device having a torus-type topology in which routers are connected vertically and laterally in a ring shape, a hierarchical topology in which transmission lines are hierarchically connected, or the like.

Figure 2:
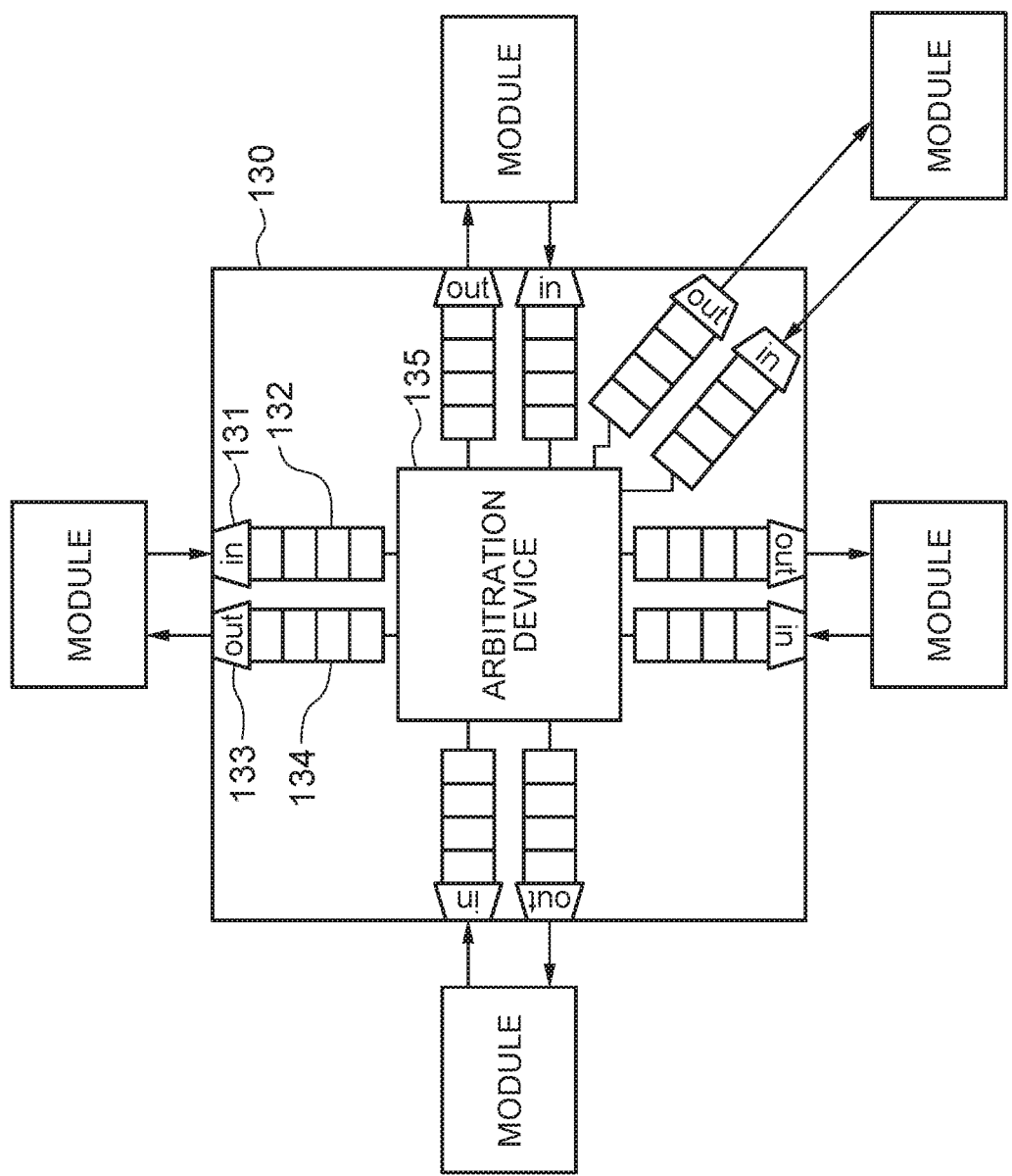
FIG. 2 is a diagram illustrating an exemplary hardware configuration of a router according to the first exemplary embodiment of the present invention.

FIG. 2 illustrates an exemplary hardware configuration of the router 130. The router 130 of this example includes, for each module connected with the router 130, an input port 131, an input buffer 132 for buffering a packet input from the input port 131, an output port 133, and an output buffer 134 for buffering a packet to be output from the output port 133.

A packet input from the input port 131 is configured of a header and data. The header includes a transmission source of the packet and a destination of the packet. The transmission source of the packet may be an address of a packet transmission module, for example. The destination of the packet may be an address of a packet receiving module, for example.

The router 130 also includes an arbitration device 135 configured to transfer a packet from the input buffer 132 to the output buffer 134. When a packet is input to the router 130 from a module connected with the router 130 via the input port 131, the router 130 stores the input packet in the input buffer 132. When a packet exists in the input buffer 132, the arbitration device 135 performs packet arbitration, and transfers the packet in the input buffer 132 to the output buffer 134 corresponding to the output port determined based on the destination of the packet. Hereinafter, an output buffer corresponding to an output port determined based on the destination of a packet is simply referred to as an output buffer corresponding to the destination of a packet. When a packet exists in the output buffer 134, the output port 133 transmits the buffer in the output buffer 134 to an adjacent module connected via a transmission line.

Figure 3:
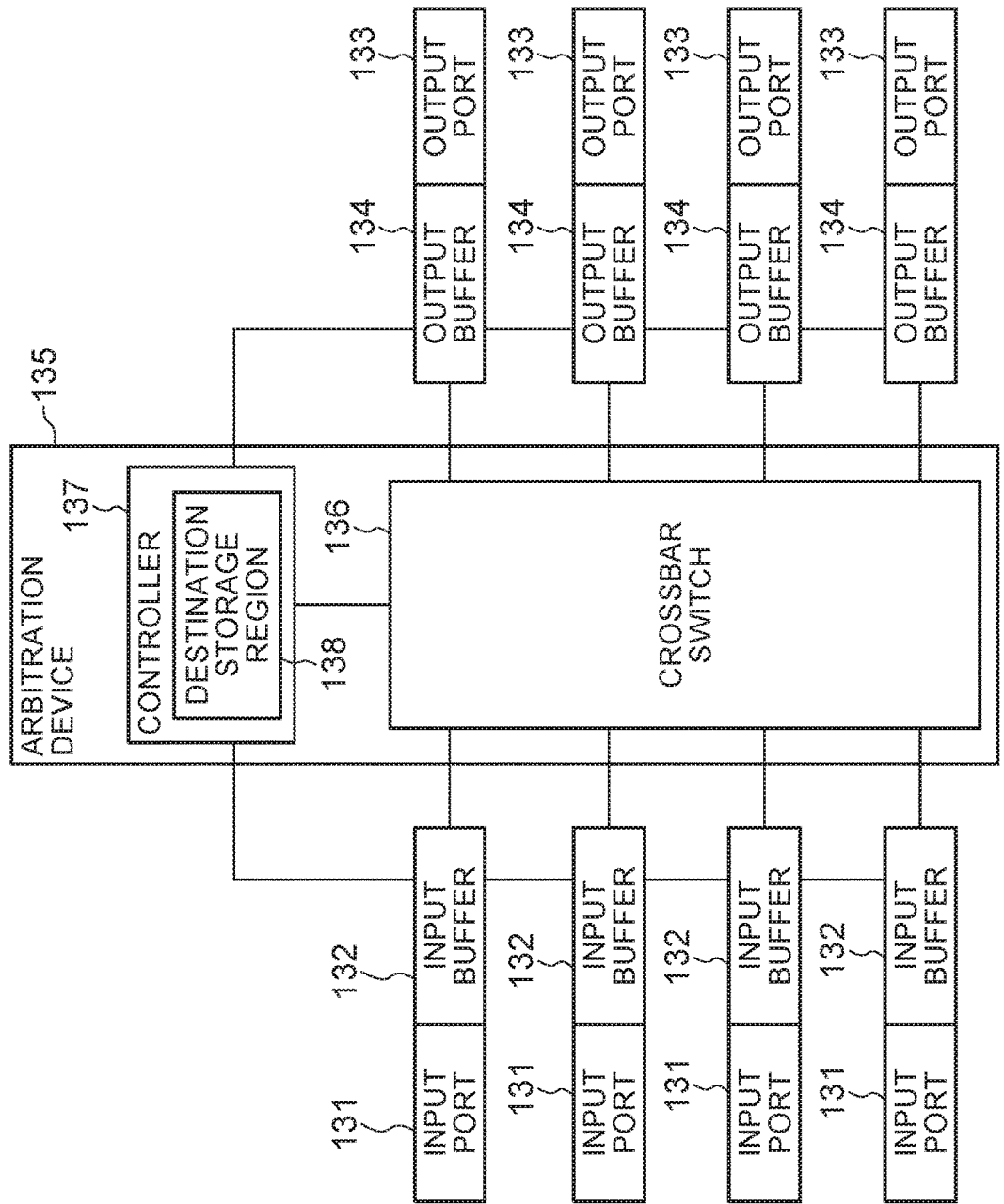
FIG. 3 is a diagram illustrating an exemplary hardware configuration of an arbitration device of a router according to the first exemplary embodiment of the present invention.

FIG. 3 illustrates an exemplary hardware configuration of the arbitration device 135. The arbitration device 135 of this example includes a crossbar switch 136 and a controller 137. The crossbar switch 136 provides a channel for transferring a packet from the input buffer 132 to the output buffer 134. The controller 137 selects a packet to be transferred from among one ore more packets stored in the input buffers 132, and performs switching of the crossbar switch 136 for transferring the selected packet to the output buffer 134 corresponding to the destination of the packet. The controller 137 includes a destination storage region 138 in which the destination of a transferred packet previously transferred to the output buffer 134 is stored, for each output buffer 134. The controller 137 determines a packet to be transferred next from the input buffers 132 to the output buffers 134, based on a result of comparison between the destination stored in the destination storage region 138 corresponding to the destination of the packet in the input buffer 132 and the destination of the packet in the input buffer 132.

Figure 4:
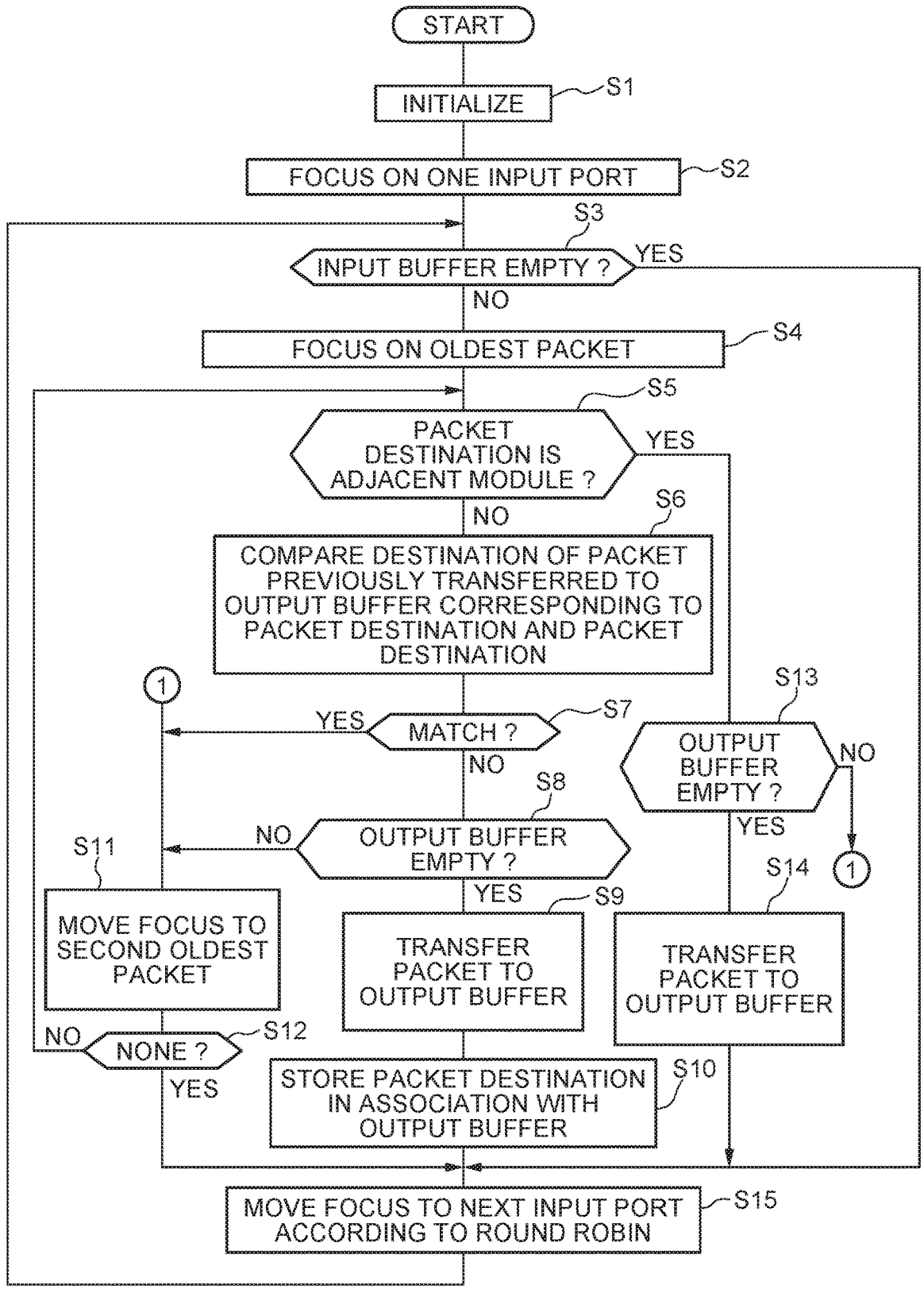
FIG. 4 is a flowchart illustrating exemplary processing performed by a controller of an arbitration device of a router according to the first exemplary embodiment of the present invention.

FIG. 4 is a flowchart illustrating exemplary processing performed by the controller 137. When the controller 137 is activated, the controller 137 begins processing illustrated in FIG. 4. First, the controller 137 performs an initialization process (step S1). In the initialization process, the controller 137 clears the storage content of the destination storage region 138. Next, the controller 137 focuses on a previously set input port 131 among a plurality of input ports 131 of the router 130 (step S2). Then, the controller 137 determines whether or not the input buffer 132 corresponding to the focused input port 131 is empty (step S3). When the input buffer 132 corresponding to the focused input port 131 is empty, the controller 137 ends the process performed on the focused input port 131, and proceeds to step S15.

When the input buffer 132 corresponding to the focused input port 131 is not empty, the controller 137 focuses on a packet stored at the earliest time in the input buffer 132 (that is, the oldest packet) among one or more packets stored in the input buffer 132 (step S4). Then, the controller 137 determines whether or not the destination of the focused packet is a module adjacent to the router 130 (step S5). In other words, the controller 137 determines whether or not the destination of the focused packet is a memory or a core connected with the router 130 without passing through another router (step S5).

When the destination of the focused packet is not a module (memory or core) adjacent to the router 130, the controller 137 then compares the destination of the focused packet with the destination of the previously transferred packet stored in the destination storage region 138 in association with the output buffer corresponding to the destination of the focused packet (step S6). When the destination of the focused packet and the destination of the transferred packet previously transferred to the output buffer corresponding to the destination of the focused packet match (Yes at step S7), the controller 137 proceeds to step S11. Meanwhile, when the destination of the focused packet and the destination of the transferred packet previously transferred to the output buffer corresponding to the destination of the focused packet do not match (No at step S7), the controller 137 determines whether or not the output buffer 134 corresponding to the destination of the focused packet is empty (step S8). When the output buffer 134 corresponding to the destination of the focused packet is not empty (No at step S8), the controller 137 proceeds to step S11. Meanwhile, when the output buffer 134 corresponding to the destination of the focused packet is empty (Yes at step S8), the controller 137 performs switching of the crossbar switch 136 so as to connect the input buffer 132 in which the focused packet is stored and the output buffer 134 corresponding to the destination, to thereby transfer the focused packet from the input buffer 132 to the output buffer 134 (step S9). Then, the controller 137 stores the destination of the focused packet in the destination storage region 138 as a destination of a previously transferred packet, in association with the output buffer of the transfer destination (step S10). Then, the controller 137 proceeds to step S15.

When the destination of the focused packet is a module (memory or core) adjacent to the router 130, the controller 137 determines whether or not the output buffer 134 corresponding to the destination of the focused packet is empty (step S13). When the output buffer 134 corresponding to the destination of the focused packet is not empty (No at step S8), the controller 137 then proceeds to step S11. Meanwhile, when the output buffer 134 corresponding to the destination of the focused packet is empty (Yes at step S13), the controller 137 performs switching of the crossbar switch 136 so as to connect the input buffer 132 in which the focused packet is stored and the output buffer 134 corresponding to the destination thereof, to thereby transfer the focused packet from the input buffer 132 to the output buffer 134 (step S9). Then, the controller 137 proceeds to step S15.

At step S11, the controller 137 moves the focus to a second oldest packet subsequent to the focused packet stored in the input buffer 132 corresponding to the focused input port. When there is such a packet (No at step S12), the controller 137 then returns to step S5, and repeats the same process as that described above. When there is no such a packet (Yes at step S12), the controller 137 proceeds to step S15.

At step S15, the controller 137 moves the focus to the next input port 131 according to a round robin system. Then, the controller 137 returns to step S3, and repeats the same process as that described above.

Next, operation of the router 130 will be described with use of a simple example.

Figure 5:
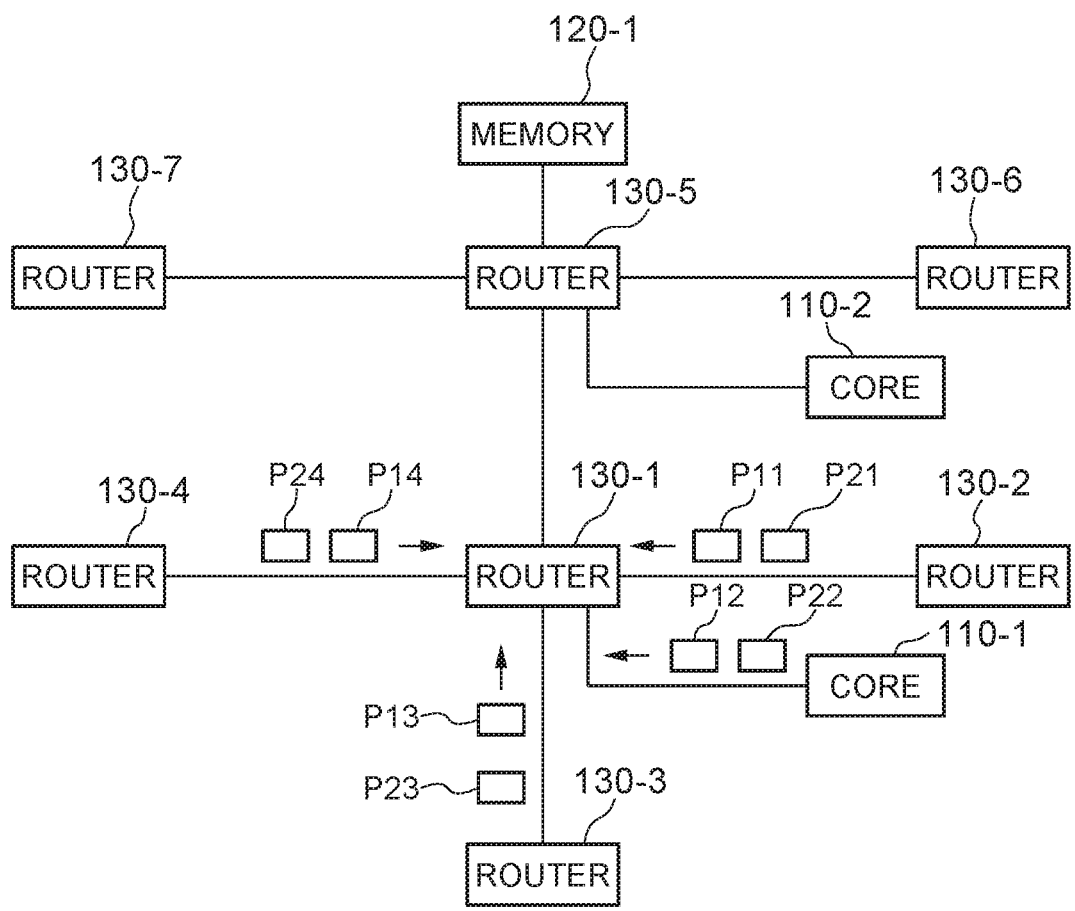
FIG. 5 is a diagram illustrating some constituent elements of an LSI chip according to the first exemplary embodiment of the present invention.

FIG. 5 illustrates some of the constituent elements of the LSI chip 100 illustrated in FIG. 1. Now, as illustrated in FIG. 5, it is assumed that to a router 130-1 on the LSI chip 100, packets P11 to P14 in which the destination thereof is a memory 120-1 and packets P21 to P24 in which the destination thereof is a core 110-2 are input in this order, from a router 130-2, a core 110-1, a router 130-3, and a router 130-4 that are adjacent to the router 130-1, respectively. Further, it is assumed that each router 130 can perform a transmission process on two packets having different destinations in parallel for each input port. The number of buffers of the input buffer 132 and the output buffer 134 of each router 130 is two (maximum two packets can be stored). At the time of inputting a first packet, every buffer is empty. Further, it is assumed that the destination storage region 138 is cleared. Description will be given on an operation of the router 130-1 to transfer the packets P11 to P14 and P21 to P24 to a router 130-5 connected with the destination modules (memory 120-1, core 110-2) at that time, with reference to FIGS. 6 to 10.

Figure 6:
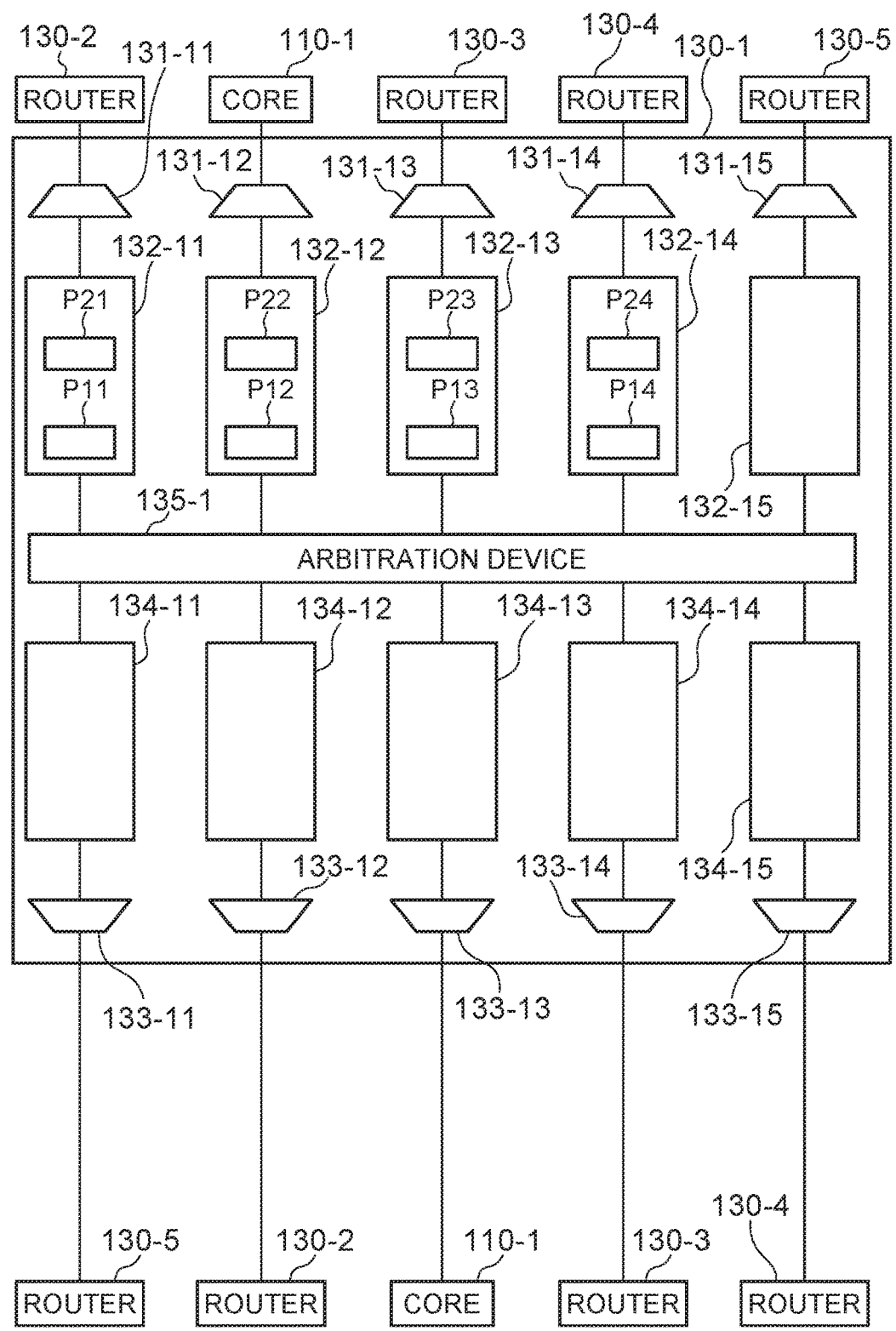
FIG. 6 illustrates an exemplary operation of a router according to the first exemplary embodiment of the present invention.

As illustrated in FIG. 6, first, the router 130-1 receives the packets P11 and P21 in this order from the router 130-2 via the input port 131-11, and stores them in the input buffer 132-11. Further, as illustrated in FIG. 6, the router 130-1 receives the packets P12 and P22 in this order from the core 110-1 via the input port 131-12, and stores them in the input buffer 132-12. Further, as illustrated in FIG. 6, the router 130-1 receives the packets P13 and P23 in this order from the router 130-3 via the input port 131-13, and stores them in the input buffer 132-13. Further, as illustrated in FIG. 6, the router 130-1 receives the packets P14 and P24 in this order from the router 130-4 via the input port 131-14, and stores them in the input buffer 132-14.

Figure 7:
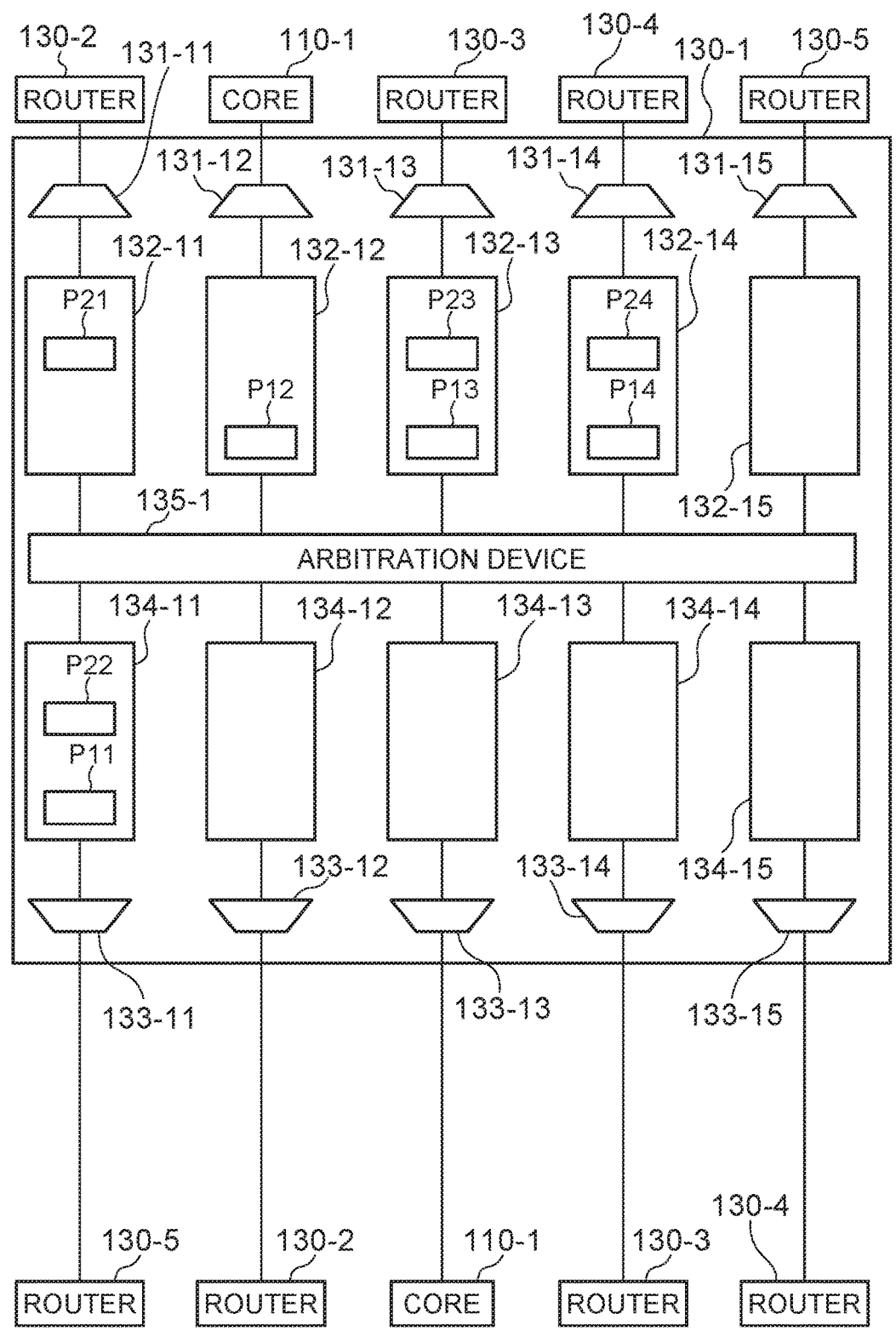
FIG. 7 illustrates an exemplary operation of a router according to the first exemplary embodiment of the present invention.

Next, the router 130-1 focuses on the input port 131-11. Next, the router 130-1 focuses on the oldest packet 11 stored in the input buffer 132-11 corresponding to the input port 131-11. Next, as the destination (memory 120-1) of the packet P11 and the destination (cleared) of the packet previously transferred to the output buffer 134-11 corresponding to the current destination do not match and there is a space in the output buffer 134-11, the router 130-1 performs switching of the crossbar switch 136 so as to connect the input buffer 132-11 and the output buffer 134-11, and, as illustrated in FIG. 7, transfers the packet P11 from the input buffer 132-11 to the output buffer 134-11. The packet P11 stored in the output buffer 134-11 is transmitted to the router 130-5 via the output port 133-11. Then, the router 130-1 stores the destination (memory 120-1) of the packet P11 in the destination storage region 138, in association with the output buffer 134-11.

Next, the router 130-1 moves the focus to the input port 131-12 according to the round robin system. The router 130-1 then focuses on the oldest packet P12 stored in the input buffer 132-12 corresponding to the input port 131-12. Then, as the destination (memory 120-1) of the packet P12 and the destination (memory 120-1) of the packet P11 previously transferred to the output buffer 134-11 corresponding to the destination of the packet P12 match, the router 130-1 moves the focus to the packet P22 that is the oldest after the packet P12. As the destination (core 110-2) of the packet P22 and the destination (memory 120-1) of the packet P11 previously transferred to the output buffer 134-11 corresponding to the destination of the packet P22 do not match and there is a space in the output buffer 134-11, the router 130-1 transfers the packet P22 from the input buffer 132-12 to the output buffer 134-11 as illustrated in FIG. 7. The packet P22 stored in the output buffer 134-11 is transmitted to the router 130-5 via the output port 133-11. Then, the router 130-1 stores the destination (core 110-2) of the packet P22 in the destination storage region 138, in association with the output buffer 134-11.

Figure 8:
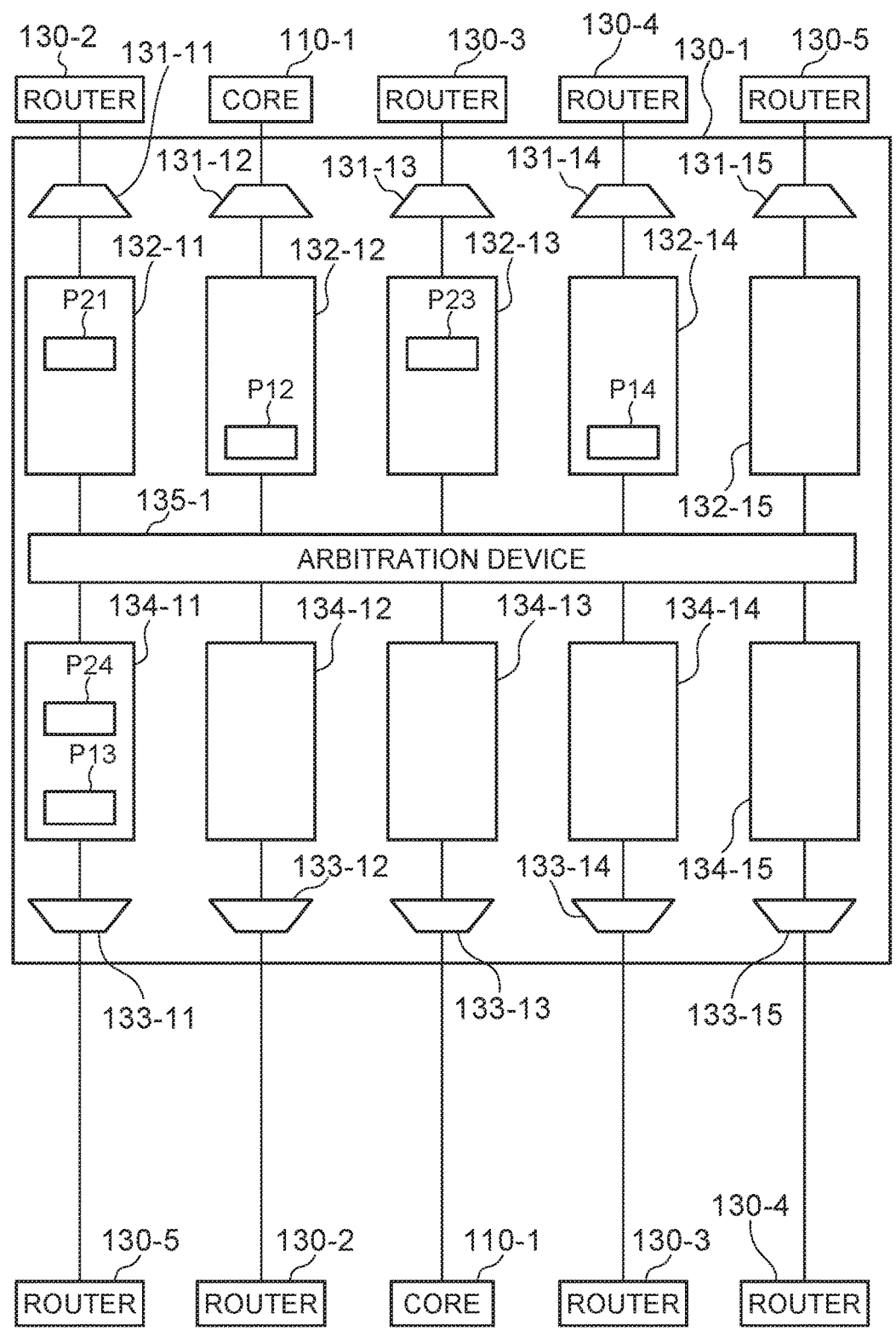
FIG. 8 illustrates an exemplary operation of a router according to the first exemplary embodiment of the present invention.

Next, the router 130-1 moves the focus to the input port 131-13 according to the round robin system. The router 130-1 then focuses on the oldest packet P13 stored in the input buffer 132-13 corresponding to the input port 131-13. As the destination (memory 120-1) of the packet P13 and the destination (core 110-2) of the packet P22 previously transferred to the output buffer 134-11 corresponding to the destination of the packet P13 do not match and there is a space in the output buffer 134-11, the router 130-1 transfers the packet P13 from the input buffer 132-13 to the output buffer 134-11 as illustrated in FIG. 8. The packet P13 stored in the output buffer 134-11 is transmitted to the router 130-5 via the output port 133-11. Then, the router 130-1 stores the destination (memory 120-1) of the packet P13 in the destination storage region 138, in association with the output buffer 134-11.

Next, the router 130-1 moves the focus to the input port 131-14 according to the round robin system. The router 130-1 then focuses on the oldest packet P14 stored in the input buffer 132-14 corresponding to the input port 131-14. As the destination (memory 120-1) of the packet P14 and the destination (memory 120-1) of the packet P13 previously transferred to the output buffer 134-11 corresponding to the destination of the packet P14 match, the router 130-1 moves the focus to the packet P24 that is the oldest after the packet P14. As the destination (core 110-2) of the packet P24 and the destination (memory 120-1) of the packet P13 previously transferred to the output buffer 134-11 corresponding to the destination of the packet P24 do not match and there is a space in the output buffer 134-11, the router 130-1 transfers the packet P24 from the input buffer 132-14 to the output buffer 134-11 as illustrated in FIG. 8. The packet P24 stored in the output buffer 134-11 is transmitted to the router 130-5 via the output port 133-11. Then, the router 130-1 stores the destination (core 110-2) of the packet P24 in the destination storage region 138, in association with the output buffer 134-11.

Figure 9:
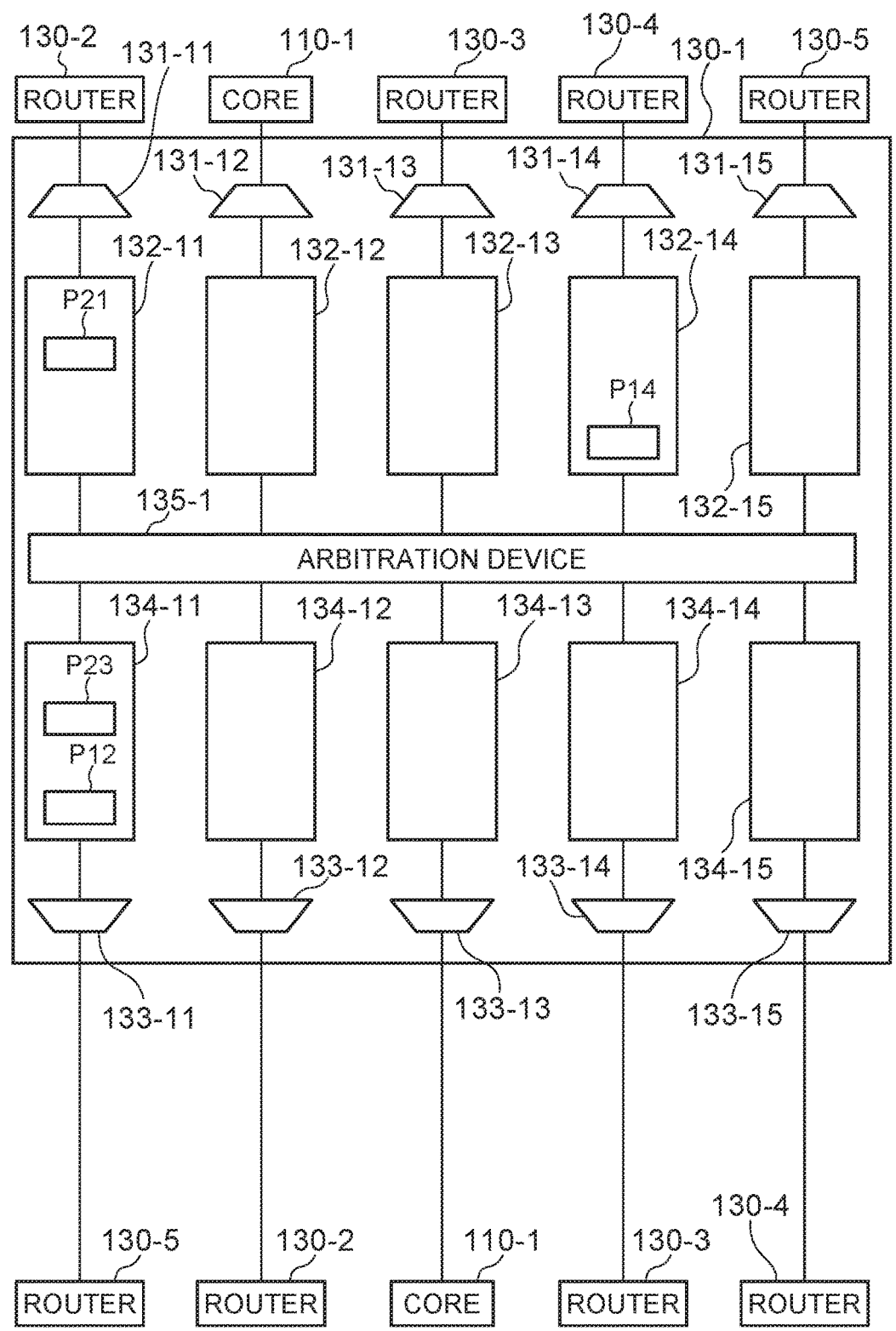
FIG. 9 illustrates an exemplary operation of a router according to the first exemplary embodiment of the present invention.

Next, the router 130-1 moves the focus to the input port 131-15 according to the round robin system. As the input buffer 132-15 corresponding to the input port 131-15 is empty, the router 130-1 moves the focus to the input port 131-11. Next, the router 130-1 focuses on the oldest packet P21 stored in the input buffer 132-11 corresponding to the input port 131-11. As the destination (core 110-2) of the packet P21 and the destination (core 110-2) of the packet P24 previously transferred to the output buffer 134-11 corresponding to the destination of the packet P21 match and there is no packet other than the packet P21 in the input buffer 132-22, the router 130-1 moves the focus to the input port 131-12 according to the round robin system. Next, the router 130-1 focuses on the oldest packet P12 stored in the input buffer 132-12 corresponding to the input port 131-12. As the destination (memory 120-1) of the packet P12 and the destination (core 110-2) of the packet P24 previously transferred to the output buffer 134-11 corresponding to the destination of the packet P12 do not match and there is a space in the output buffer 134-11, the router 130-1 transfers the packet P12 from the input buffer 132-12 to the output buffer 134-11 as illustrated in FIG. 9. The packet P12 stored in the output buffer 134-11 is transmitted to the router 130-5 via the output port 133-11. Then, the router 130-1 stores the destination (memory 120-1) of the packet P12 in the destination storage region 138, in association with the output buffer 134-11.

Next, the router 130-1 moves the focus to the input port 131-13 according to the round robin system. The router 130-1 then focuses on the oldest packet P23 stored in the input buffer 132-13 corresponding to the input port 131-13. As the destination (core 110-2) of the packet P23 and the destination (memory 120-1) of the packet P12 previously transferred to the output buffer 134-11 corresponding to the destination of the packet P23 do not match and there is a space in the output buffer 134-11, the router 130-1 transfers the packet P23 from the input buffer 132-13 to the output buffer 134-11 as illustrated in FIG. 9. The packet P23 stored in the output buffer 134-11 is transmitted to the router 130-5 via the output port 133-11. Then, the router 130-1 stores the destination (core 110-2) of the packet P23 in the destination storage region 138, in association with the output buffer 134-11.

Figure 10:
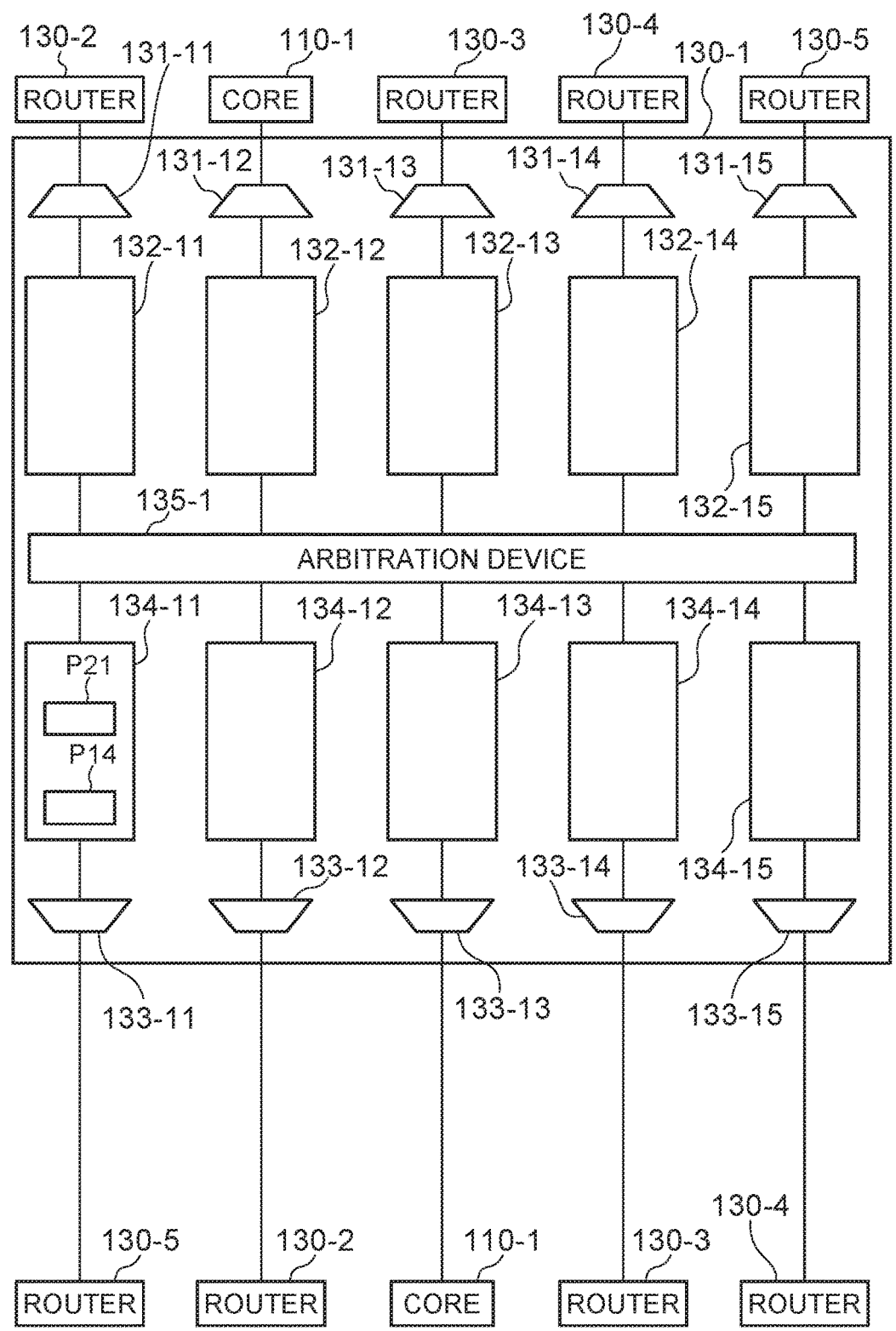
FIG. 10 illustrates an exemplary operation of a router according to the first exemplary embodiment of the present invention.

Next, the router 130-1 moves the focus to the input port 131-14 according to the round robin system. The router 130-1 then focuses on the oldest packet P14 stored in the input buffer 132-14 corresponding to the input port 131-14. As the destination (memory 120-1) of the packet P14 and the destination (core 110-2) of the packet P23 previously transferred to the output buffer 134-11 corresponding to the destination of the packet P14 do not match and there is a space in the output buffer 134-11, the router 130-1 transfers the packet P14 from the input buffer 132-14 to the output buffer 134-11 as illustrated in FIG. 10. The packet P14 stored in the output buffer 134-11 is transmitted to the router 130-5 via the output port 133-11. Then, the router 130-1 stores the destination (memory 120-1) of the packet P14 in the destination storage region 138, in association with the output buffer 134-11.

Next, the router 130-1 moves the focus to the input port 131-15 according to the round robin system. As the input buffer 132-15 corresponding to the input port 131-15 is empty, the router 130-1 moves the focus to the input port 131-11. Next, the router 130-1 focuses on the oldest packet P21 stored in the input buffer 132-11 corresponding to the input port 131-11. As the destination (core 110-2) of the packet P21 and the destination (memory 120-1) of the packet P14 previously transferred to the output buffer 134-11 corresponding to the destination of the packet P21 do not match and there is a space in the output buffer 134-11, the router 130-1 transfers the packet P21 from the input buffer 132-11 to the output buffer 134-11 as illustrated in FIG. 10. The packet P21 stored in the output buffer 134-11 is transmitted to the router 130-5 via the output port 133-11.

In this way, the packets P11, P22, P13, P24, P12, P23, P14, and P21 are transmitted in this order from the router 130-1 to the router 130-5. This means that the packets having the same destination are not transmitted consecutively from the router 130-1 to the router 130-5. When the packets are stored in the input buffer of the router 130-5 in the aforementioned order, the input buffer will never be occupied by the packets having the same destination. Accordingly, even when transfer waiting occurs between the router 130-5 and a module connected with the router 130-5, as packets having the same destination are not stored consecutively in the input buffer of the router 130-5, it is possible to transfer packets having a destination that is a module in which transfer waiting does not occur. As a result, buffer resources of the router 130 can be used effectively, which improves throughput and latency.

Next, description will be given on an operation of the router 130-5 in the case where packets are transmitted from the router 130-1 to the router 130-5 in the order of packets described above, with reference to FIGS. 11 to 18. It should be noted that every buffer is empty at the time of inputting the first packet. Further, transfer waiting occurs temporarily between the router 130-5 and the memory 120-1.

Figure 11:
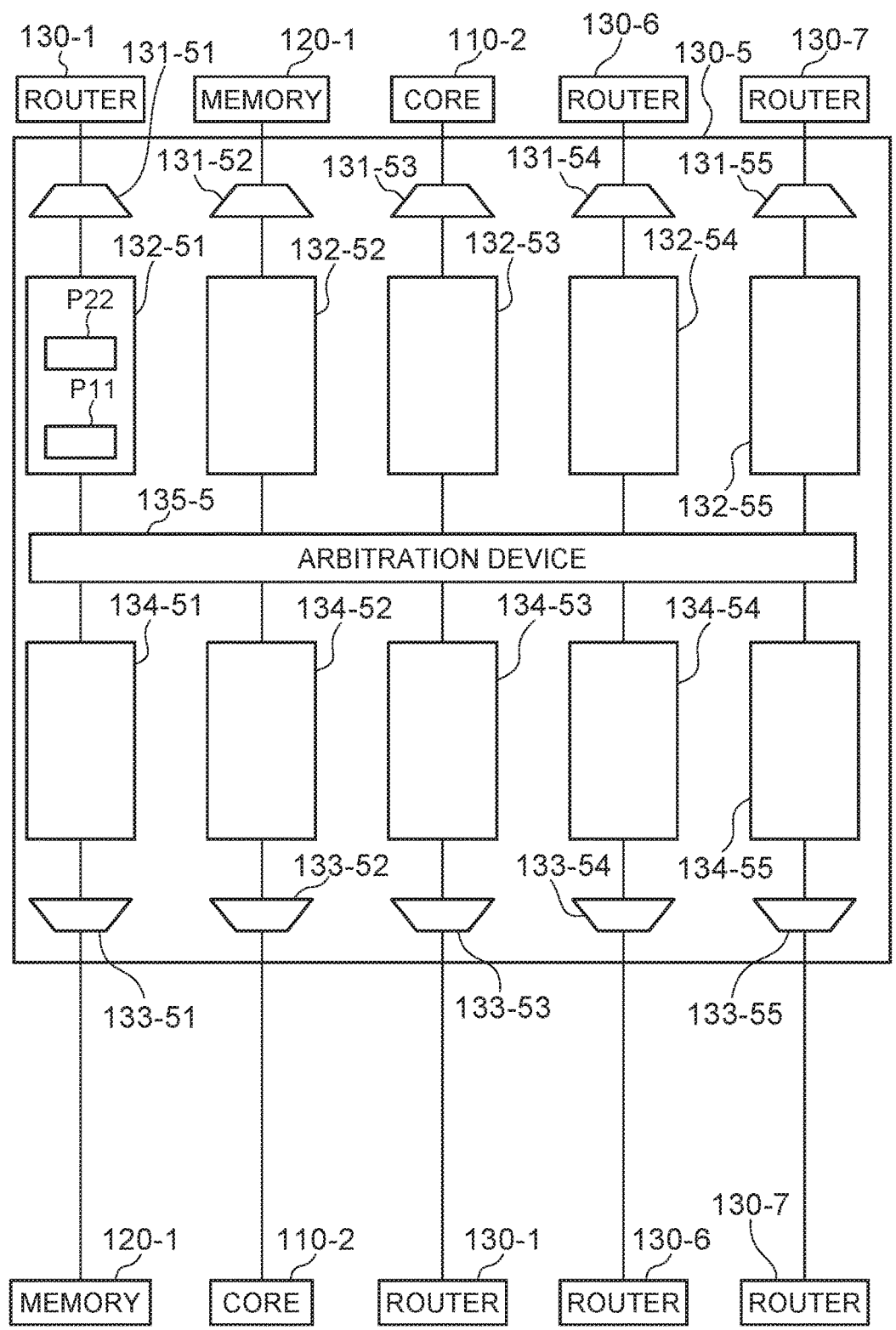
FIG. 11 illustrates an exemplary operation of a router according to the first exemplary embodiment of the present invention.
Figure 12:
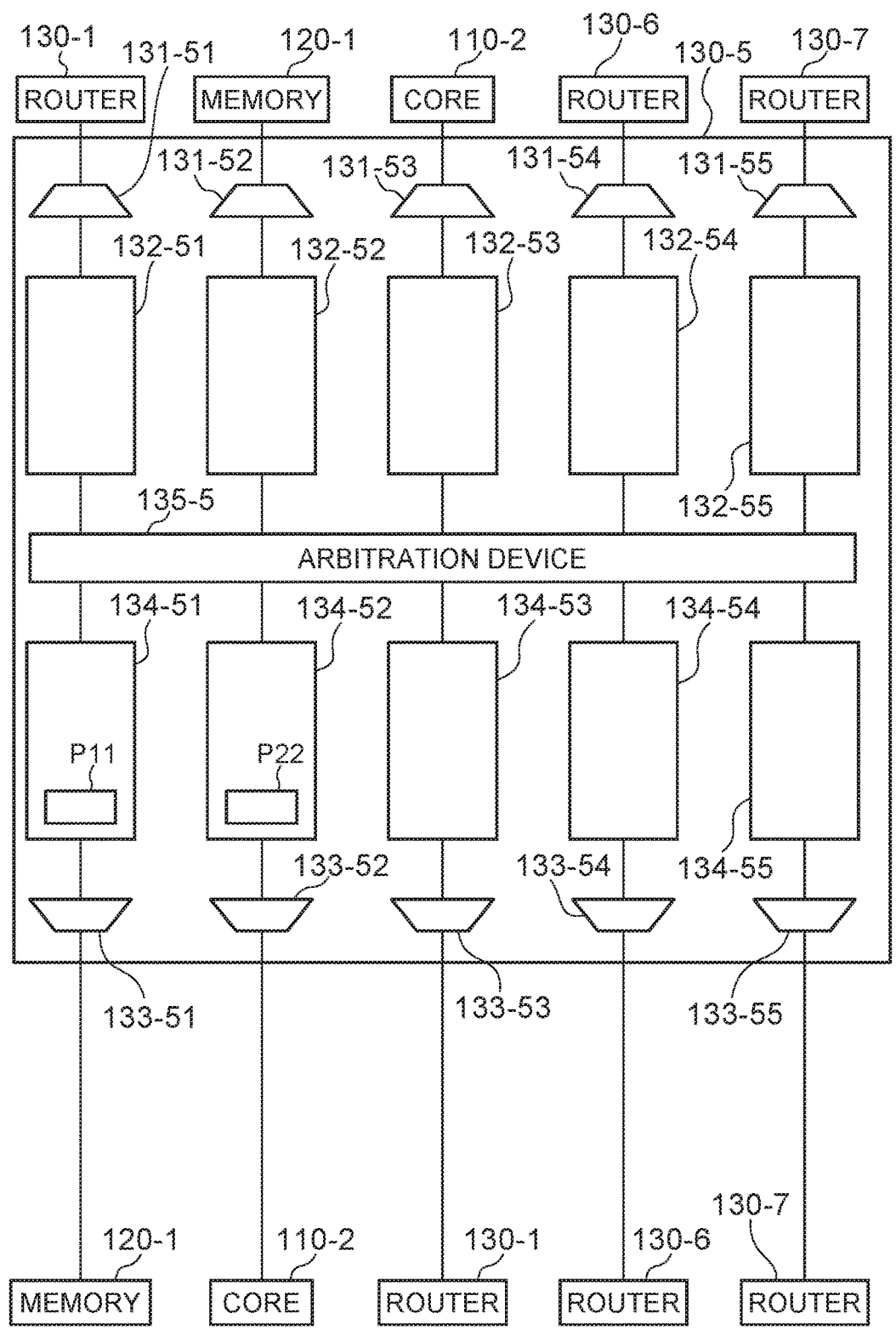
FIG. 12 illustrates an exemplary operation of a router according to the first exemplary embodiment of the present invention.

As illustrated in FIG. 11, the router 130-5 receives the packets P11 and P22 in this order from the router 130-1 via the input port 131-51, and stores them in the input buffer 132-51. Next, the router 130-5 focuses on the input port 131-51. The router 130-5 then focuses on the oldest packet P11 stored in the input buffer 132-51 corresponding to the input port 131-51. As the destination (memory 120-1) of the packet P11 is a module adjacent to the router 130-5 and there is a space in the output buffer 134-51 corresponding to the destination of the packet P11, the router 130-5 transfers the packet P11 from the input buffer 132-51 to the output buffer 134-51 as illustrated in FIG. 12. The packet P11 stored in the output buffer 134-51 is about to be transmitted to the memory 120-1 via the output port 133-51. However, as transfer waiting occurs between the router 130-5 and the memory 120-1, transmission is retained. Accordingly, the packet P11 remains in the output buffer 134-51 until the transfer waiting is solved.

Next, the router 130-5 moves the focus to the input port 131-52, the input port 131-53, the input port 131-54, and the input port 131-55 in this order, according to the round robin system. As the input buffers 132-52 to 132-55 corresponding to the input ports 131-52 to 131-55 are empty, the router 130-1 moves the focus to the input port 131-51 again according to the round robin system. Next, the router 130-5 focuses on the oldest packet P22 stored in the input buffer 132-51 corresponding to the input port 131-51. As the destination (core 110-2) of the focused packet P22 is a module adjacent to the router 130-5 and there is a space in the output buffer 134-52 corresponding to the destination of the packet P22, the router 130-5 transfers the packet P22 from the input buffer 132-51 to the output buffer 134-52 as illustrated in FIG. 12. The packet P22 stored in the output buffer 134-52 is transmitted to the core 110-2 via the output port 133-52.

Figure 13:
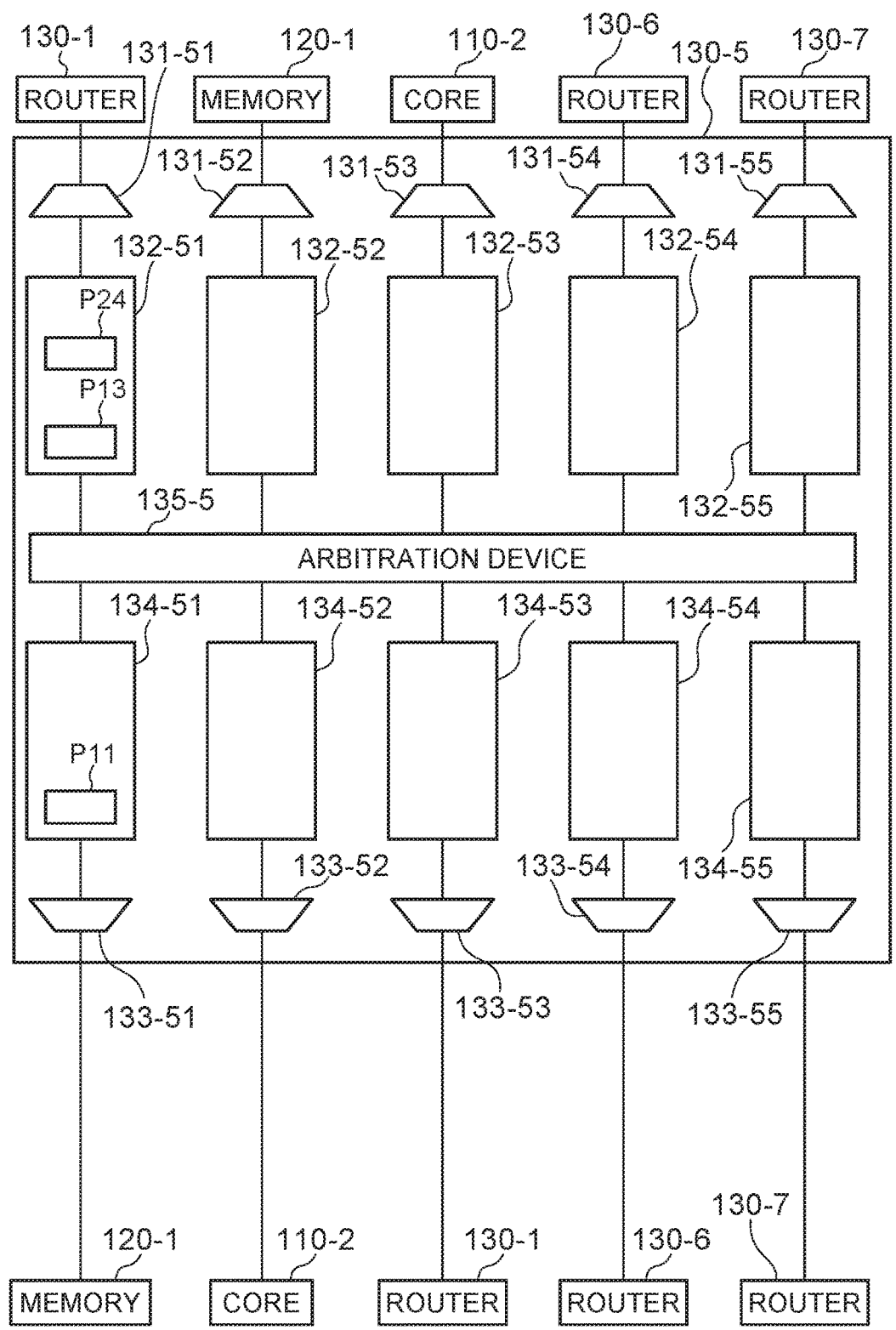
FIG. 13 illustrates an exemplary operation of a router according to the first exemplary embodiment of the present invention.

Meanwhile, when a space is generated in the input buffer 132-51 of the router 130-5 due to transfer of the packets P11 and P22, the packets P13 and P24 transmitted from the router 130-1 to the router 130-5 are stored in the input buffer 132-51 via the input port 131-51, as illustrated in FIG. 13.

Next, when the router 130-5 focuses on the input port 131-51 again, the router 130-5 focuses on the oldest packet P13 stored in the input buffer 132-51 corresponding to the input port 131-51. As the destination (memory 120-1) of the focused packet P13 is a module adjacent to the router 130-5 and there is a space in the output buffer 134-51 corresponding to the destination of the packet P13, the router 130-5 transfers the packet P13 from the input buffer 132-51 to the output buffer 134-51.

Then, when the router 130-5 focuses on the input port 131-51 again, the router 130-5 focuses on the oldest packet P24 stored in the input buffer 132-51 corresponding to the input port 131-51. As the destination (core 110-2) of the focused packet P24 is a module adjacent to the router 130-5 and there is a space in the output buffer 134-52 corresponding to the destination of the packet P24, the router 130-5 transfers the packet P24 from the input buffer 132-51 to the output buffer 134-52. When the transfer waiting between the router 130-5 and the memory 120-1 is continued, the packets P11 and P13 still remain in the output buffer 134-51. On the other hand, the packet P24 stored in the output buffer 134-52 is transmitted to the core 110-2 via the output port 133-52.

Figure 14:
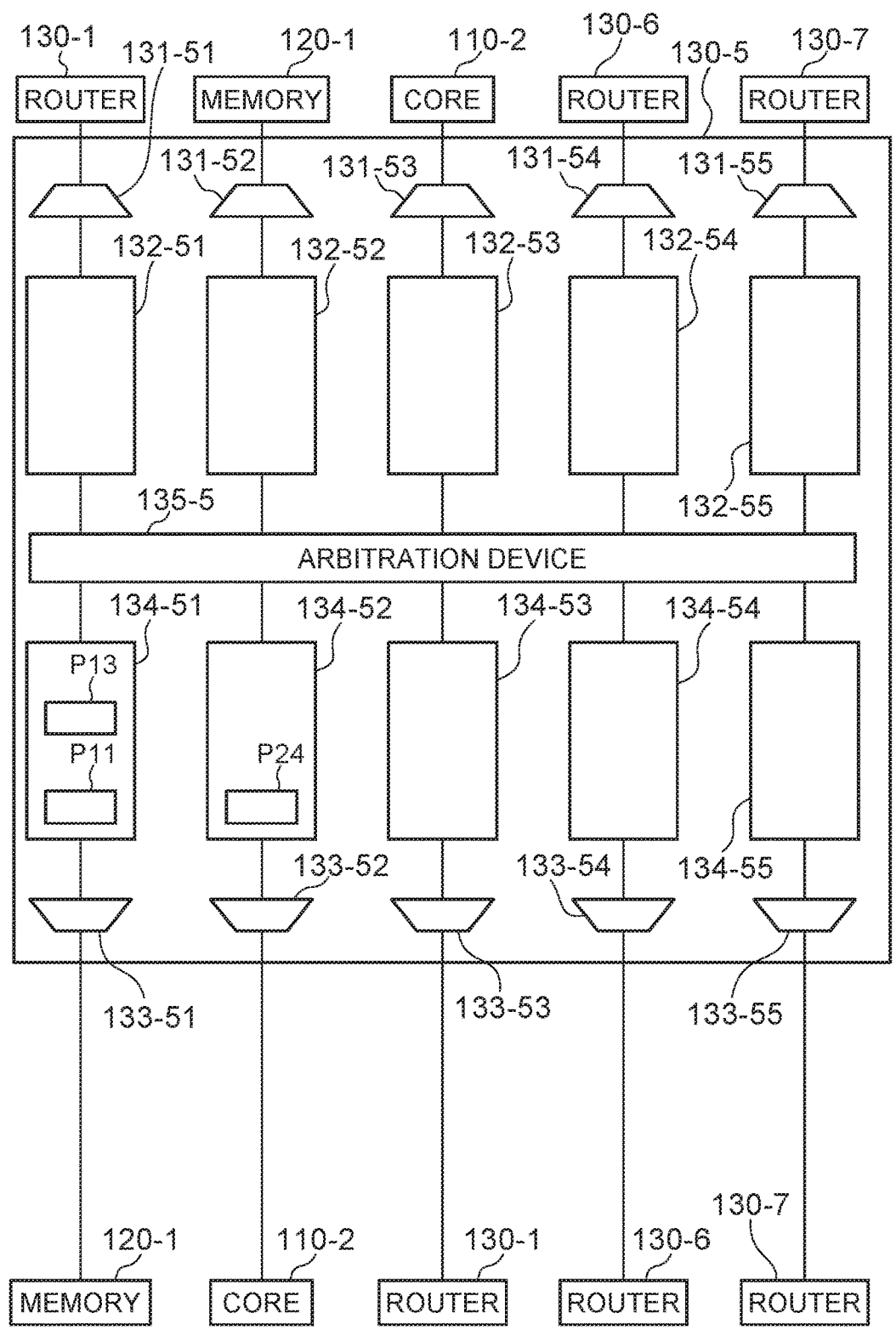
FIG. 14 illustrates an exemplary operation of a router according to the first exemplary embodiment of the present invention.
Figure 15:
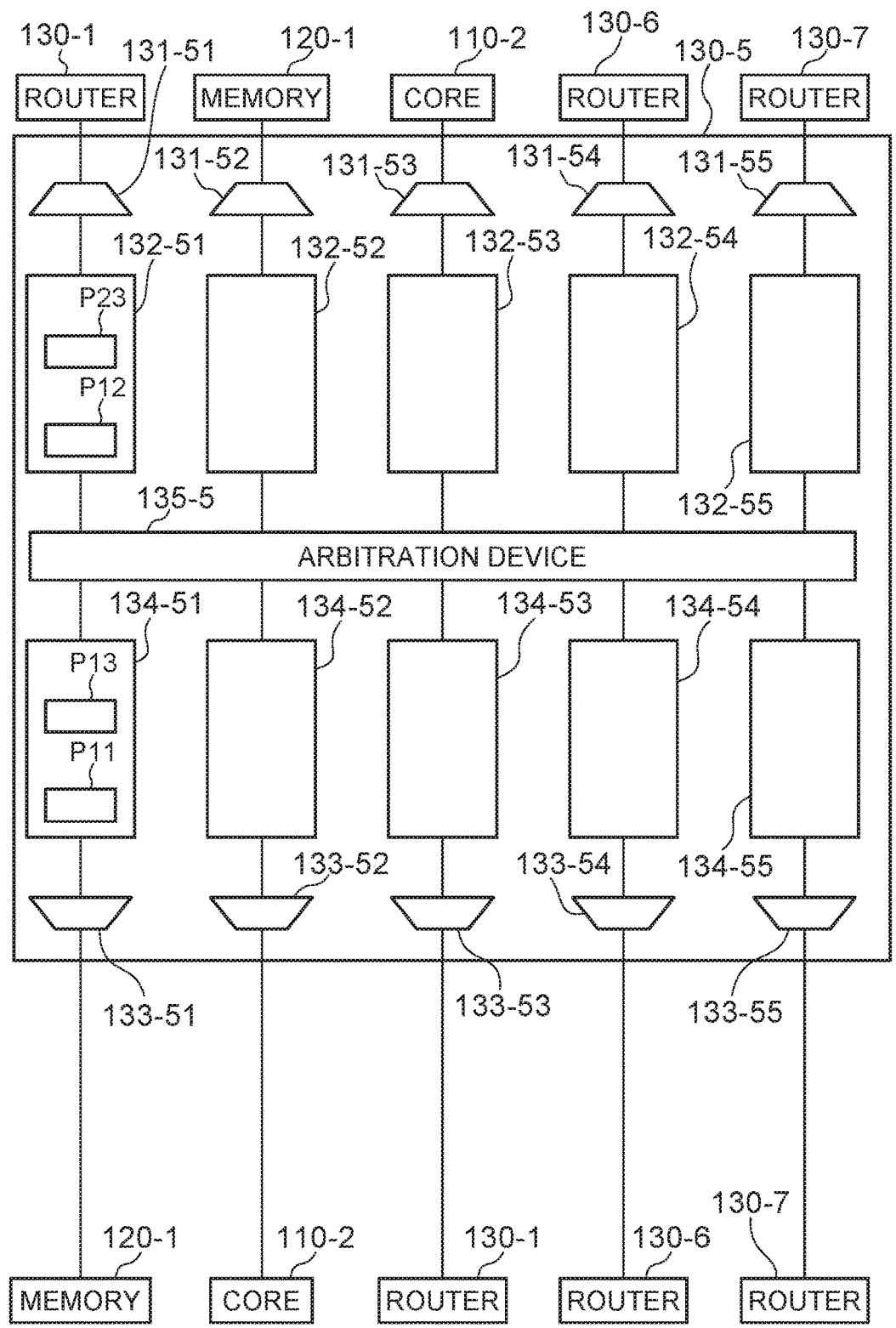
FIG. 15 illustrates an exemplary operation of a router according to the first exemplary embodiment of the present invention.
Figure 16:
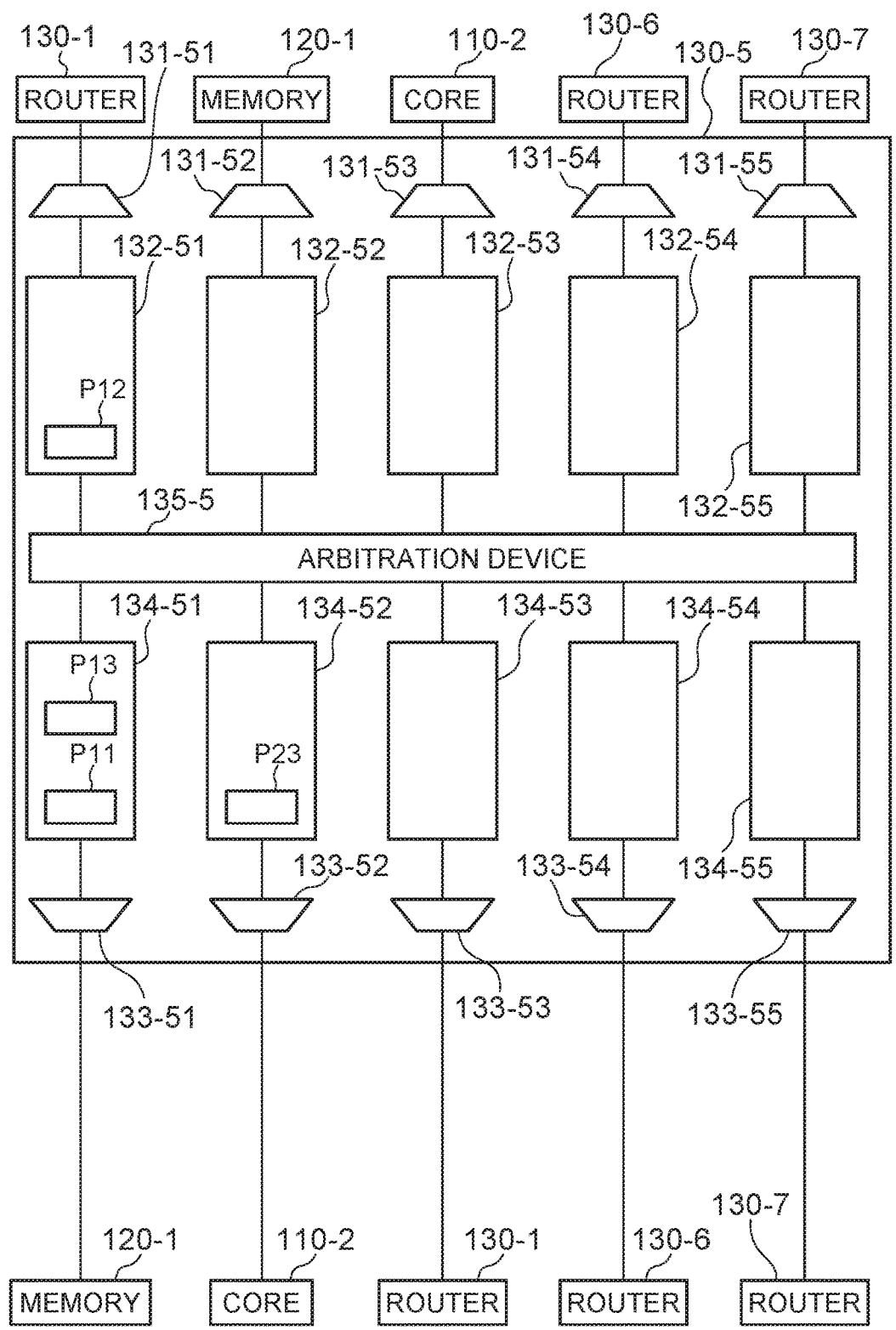
FIG. 16 illustrates an exemplary operation of a router according to the first exemplary embodiment of the present invention.

When a space is generated in the input buffer 132-51 of the router 130-5 due to the transfer of the packets P13 and P24 as illustrated in FIG. 14, the packets P12 and P23 transmitted from the router 130-1 to the router 130-5 are stored in the input buffer 132-51 via the input port 131-51, as illustrated in FIG. 15. As there is no space in the output buffer 134-51 corresponding to the destination of the packet P12 stored in the input buffer 132-51, the router 130-5 withholds transfer of the packet P12, and processes the packet P23 stored in the input buffer 132-51. As a result, the packet P23 is transferred to the output buffer 134-52 corresponding to the destination as illustrated in FIG. 16, and then, transmitted to the core 110-2 from the output port 133-52. Then, as a space is generated in the input buffer 132-51 of the router 130-5 as illustrated in FIG. 16, the packet P14 transmitted from the router 130-1 to the router 130-5 is stored in the input buffer 132-51 via the input port 131-51, as illustrated in FIG. 17.

Figure 17:
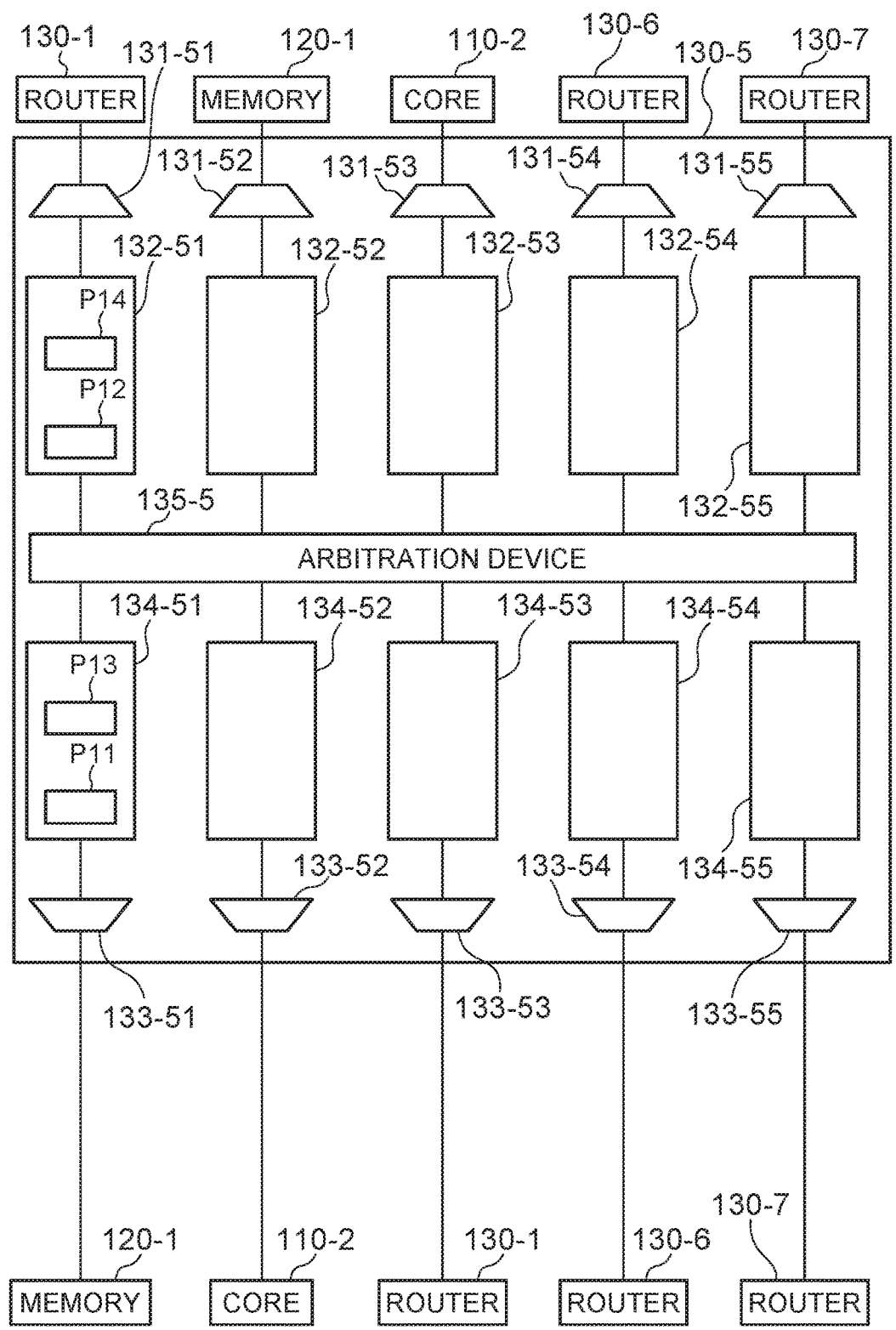
FIG. 17 illustrates an exemplary operation of a router according to the first exemplary embodiment of the present invention.

As illustrated in FIG. 17, when the input buffer 132-51 is occupied by the packets P12 and P14 in which the destination thereof is the memory 120-1 and there is no space in the output buffer 134-51 corresponding to the destination, the router 130-5 cannot receive the following packets from the router 130-1. However, the router 130-5 received seven packets in total, namely P11, P22, P13, P24, P12 P23, and P14, from the router 130-1 until it cannot receive the following packets any more from the router 130-1, and the router 130-5 transmitted three packets P22, P24, and P23 in total, among them, to the destination core 110-2.

Next, in order to make comparison with the present embodiment, description will be given on the case where the arbitration device 135-1 of the router 130-1 adopts an arbitration method of selecting an oldest packet from an input buffer corresponding to an input port selected by the round robin system and transmitting it to an output buffer, without considering whether or not the packet has a destination different from the destination of the packet previously transferred.

The state of the router 130-1 when the packets P11 to P14 in which the destinations thereof are the memory 120-1 and the packets P21 to P24 in which the destinations thereof are the core 110-2 are input in this order from the router 130-2, the core 110-1, the router 130-3, and the router 130-4 that are adjacent to the router 130-1, respectively, is the same as that illustrated in FIG. 6 described above. In the state illustrated in FIG. 6, the arbitration device 135-1 selects the oldest packet P11 from the input buffer 132-11 focused first, and transfers it to the output buffer 134-11. Next, the arbitration device 135-1 selects the oldest packet P12 from the input buffer 132-12 focused next according to the round robin system, and transfers it to the output buffer 134-11. Similarly, the arbitration device 135-1 selects the oldest packets P13, P14 from the input buffers 132-13, 132-14 focused sequentially according to the round robin system, and transfers them to the output buffer 134-11. Similarly, the arbitration device 135-1 transfers the remaining packets P21, P22, P23, and P24, in this order, to the output buffer 134-11. As a result, the packets P11, P12, P13, P14, P21, P22, P23, and P24 are transmitted, in this order, from the router 130-1 to the router 130-5. This means that the four packets P11 to P14 in which the destinations thereof are the same memory 120-1 are transmitted consecutively from the router 130-1 to the router 130-5, and then, the four packets P21 to P24 in which the destinations thereof are the same core 110-2 are transmitted consecutively.

Figure 18:
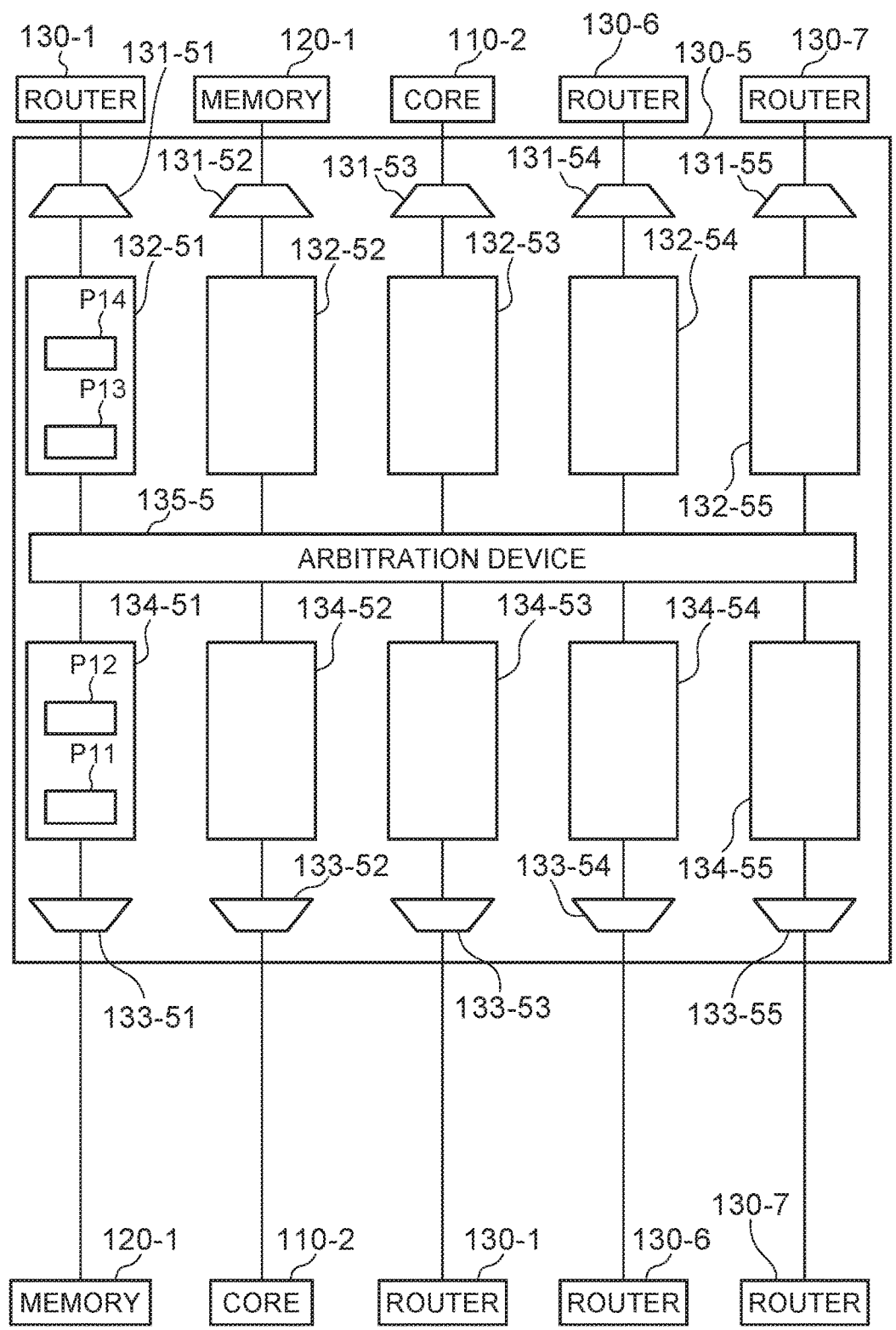
FIG. 18 illustrates an exemplary operation of a router according to the first exemplary embodiment of the present invention.

As a result, when transfer waiting occurs between the router 130-5 and the memory 120-1, in a state where the first four packets P11 to P14 are received by the router 130-5, the packets P11 and P12 are stored in the output buffer 134-51 and the packets P13 and P14 are stored in the input buffer 132-51, as illustrated in FIG. 18. At that time, the router 130-5 becomes unable to receive the following packets from the router 130-1. Until such a state, the router 130-5 received only four packets P11 to P14 from the router 130-1, and could not transmit any packet to the core 110-2.

In FIGS. 6 and 18, the number of buffers of each of the input buffer and the output buffer of the router 130 is two. Next, an operation in the case where the number of buffers of each of the input buffer and the output buffer of the router 130 is one (maximum one packet can be stored) will be described with reference to FIGS. 19 to 26. The conditions other than the number of buffers are the same as those of the example described above.

Figure 19:
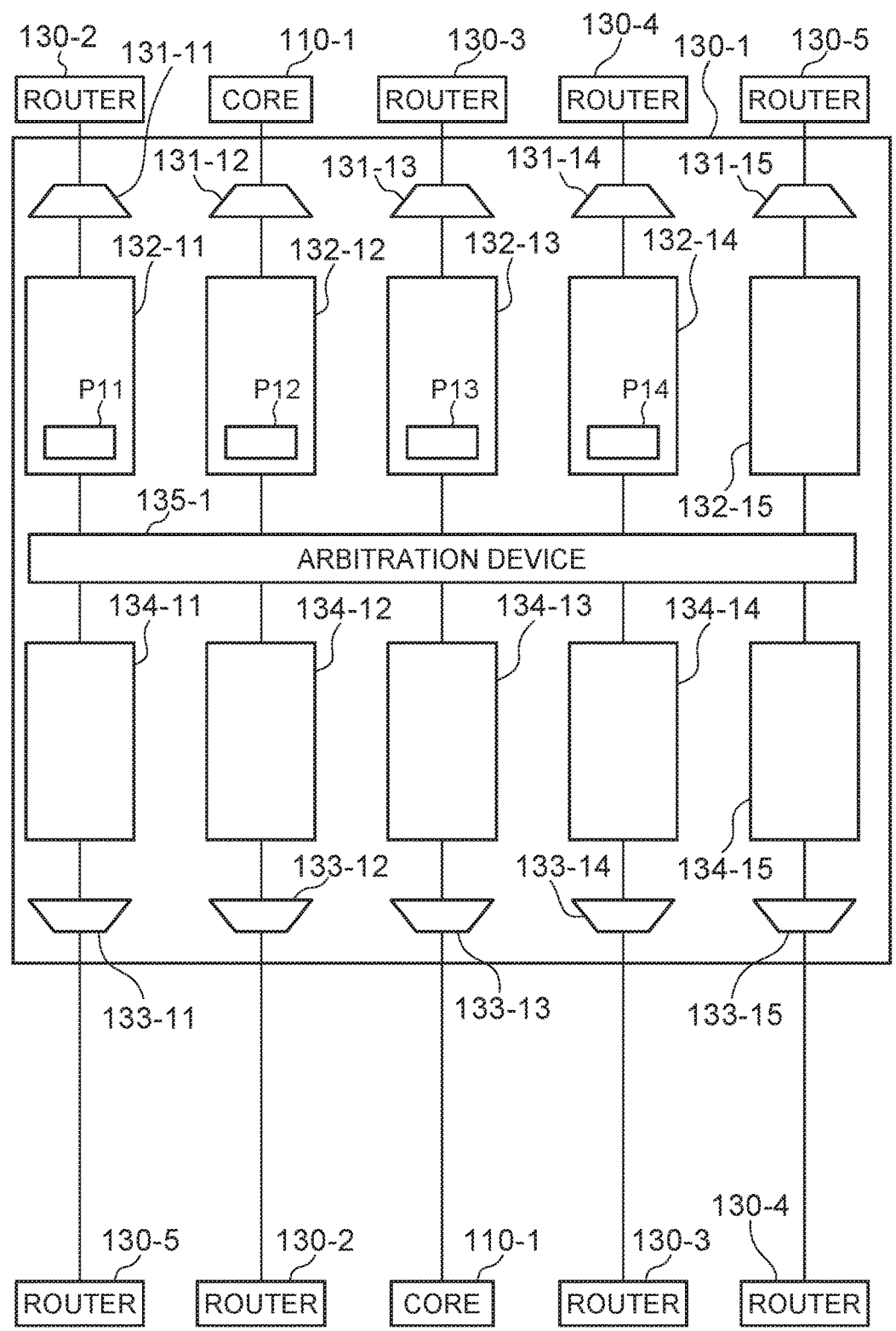
FIG. 19 illustrates an exemplary operation of a router according to the first exemplary embodiment of the present invention.

As illustrated in FIG. 19, first, the router 130-1 receives the packet P11 from the router 130-2 via the input port 131-11, and stores it in the input buffer 132-11. Further, the router 130-1 receives the packets P12 from the core 110-1 via the input port 131-12, and stores it in the input buffer 132-12 as illustrated in FIG. 19. Further, the router 130-1 receives the packet P13 from the router 130-3 via the input port 131-13, and stores it in the input buffer 132-13 as illustrated in FIG. 19. Further, the router 130-1 receives the packet P14 from the router 130-4 via the input port 131-14, and stores it in the input buffer 132-14 as illustrated in FIG. 19.

Figure 20:
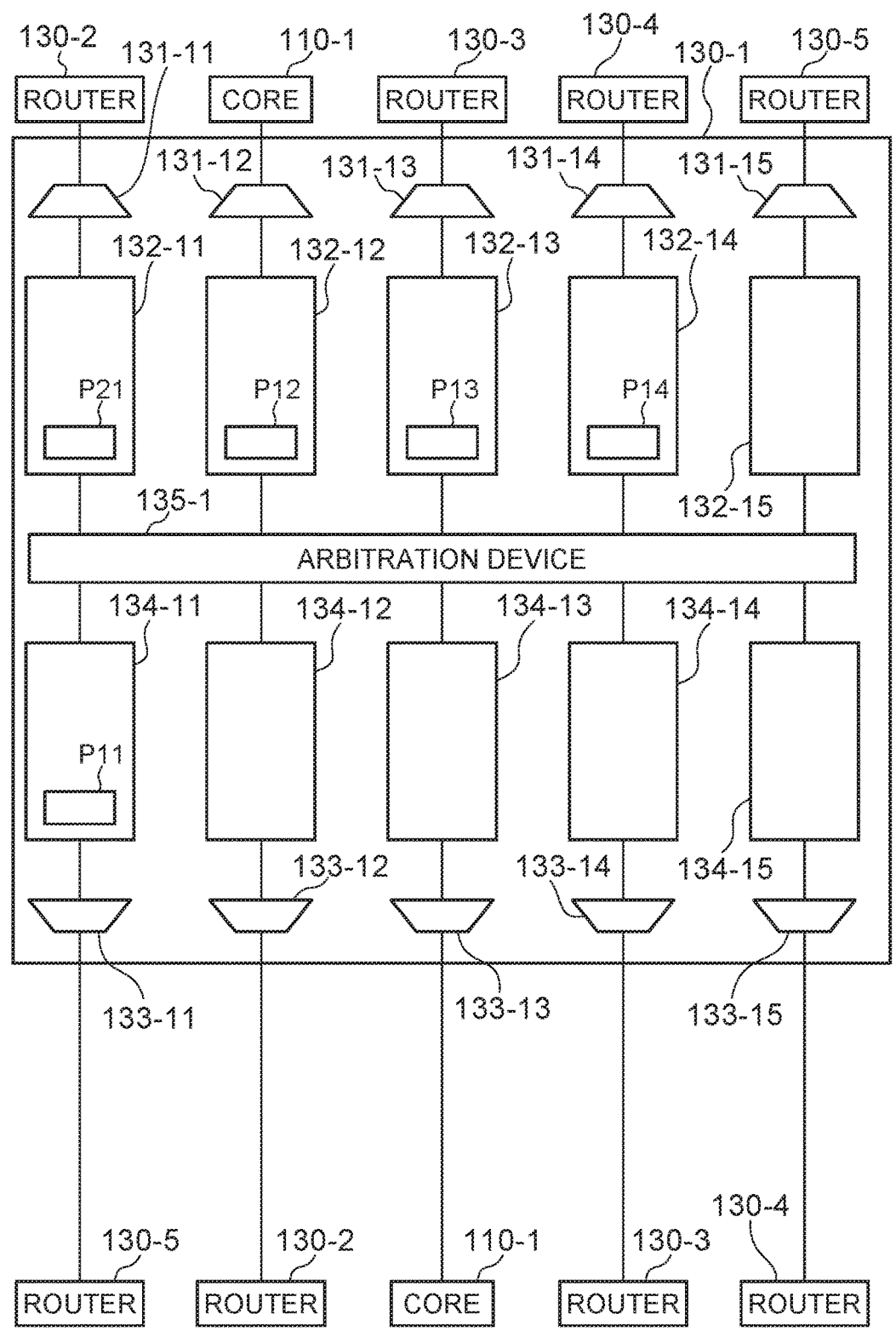
FIG. 20 illustrates an exemplary operation of a router according to the first exemplary embodiment of the present invention.

Next, the router 130-1 focuses on the input port 131-11. The router 130-1 then focuses on the oldest packet P11 stored in the input buffer 132-11 corresponding to the input port 131-11. As the destination (memory 120-1) of the packet P11 and the destination (cleared) of the packet previously transferred to the output buffer 134-11 corresponding to the destination of the packet P11 do not match and there is a space in the output buffer 134-11, the router 130-1 transfers the packet P11 from the input buffer 132-11 to the output buffer 134-11 as illustrated in FIG. 20. The packet P11 stored in the output buffer 134-11 is transmitted to the router 130-5 via the output port 133-11. When a space is generated in the input buffer 132-11 of the router 130-1 due to the transfer of the packet P11, the packets P21 transmitted from the router 130-2 is stored in the input buffer 132-11 via the input port 131-11, as illustrated in FIG. 20. Then, the router 130 stores the destination (memory 120-1) of the packet P11 in the destination storage region 138, in association with the output buffer 134-11.

Next, the router 130-1 moves the focus to the input port 131-12 according to the round robin system. The router 130-1 then focuses on the oldest packet 12 stored in the input buffer 132-12 corresponding to the input port 131-12. As the destination (memory 120-1) of the packet P12 and the destination (memory 120-1) of the packet P11 previously transferred to the output buffer 134-11 corresponding to the destination of the packet P12 match and there is no packet other than the packet P12 in the input buffer 132-12, the router 130-1 moves the focus to the input port 131-13 according to the round robin system. Then, the router 130-1 moves the focus to the input port 131-14 and to the input port 131-15 without performing transfer of any packet, and then focuses on the input port 131-11 again.

Figure 21:
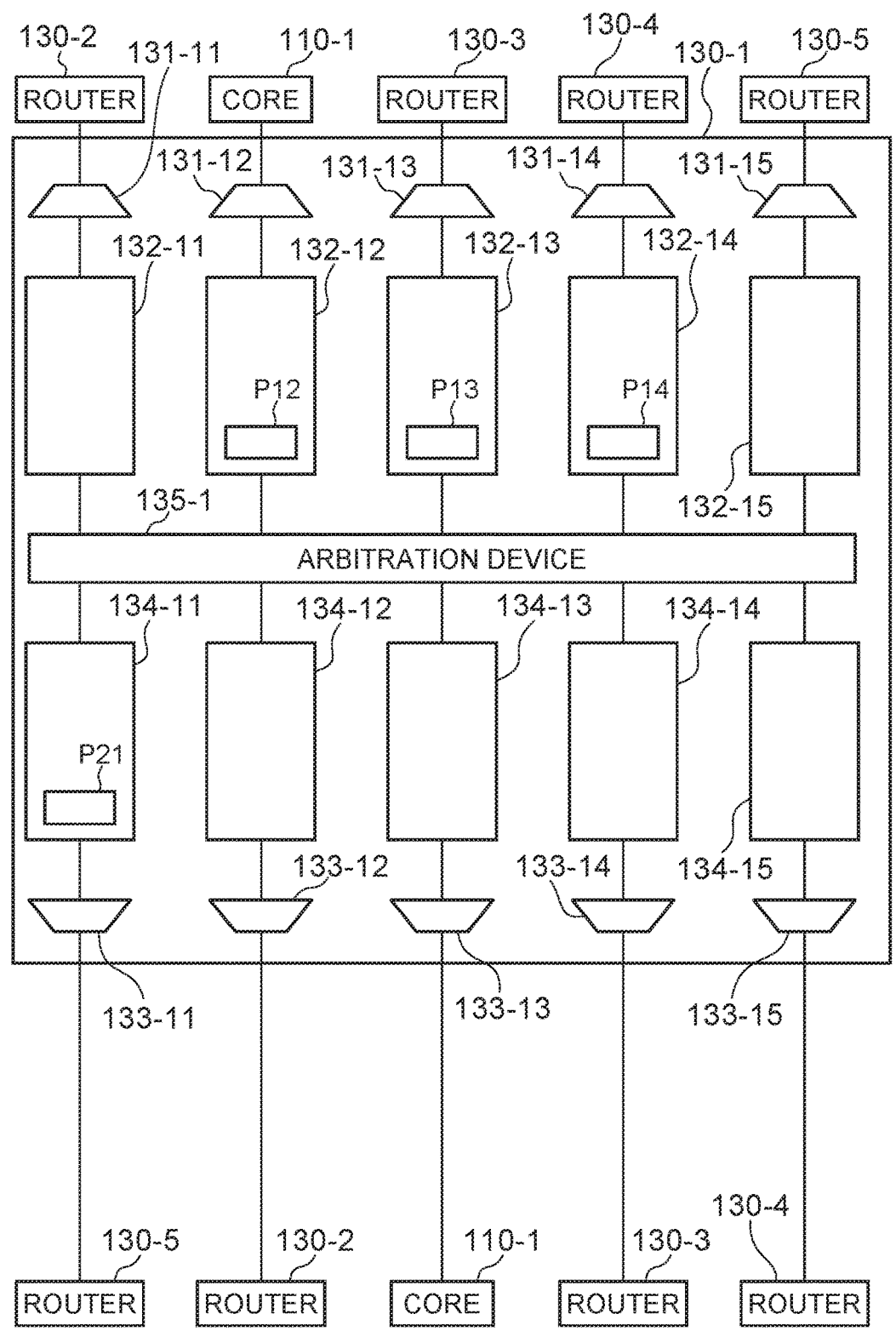
FIG. 21 illustrates an exemplary operation of a router according to the first exemplary embodiment of the present invention.

Next, the router 130-1 focuses on the oldest packet P21 stored in the input buffer 132-11 corresponding to the input port 131-11. As the destination (core 110-2) of the packet P21 and the destination (memory 120-1) of the packet P11 previously transferred to the output buffer 134-11 corresponding to the destination of the packet P21 do not match and there is a space in the output buffer 134-11, the router 130-1 transfers the packet P21 from the input buffer 132-11 to the output buffer 134-11 as illustrated in FIG. 21. The packet P21 stored in the output buffer 134-11 is transmitted to the router 130-5 via the output port 133-11. Then, the router 130-1 stores the destination (core 110-2) of the packet P21 in the destination storage region 138, in association with the output buffer 134-11.

Figure 22:
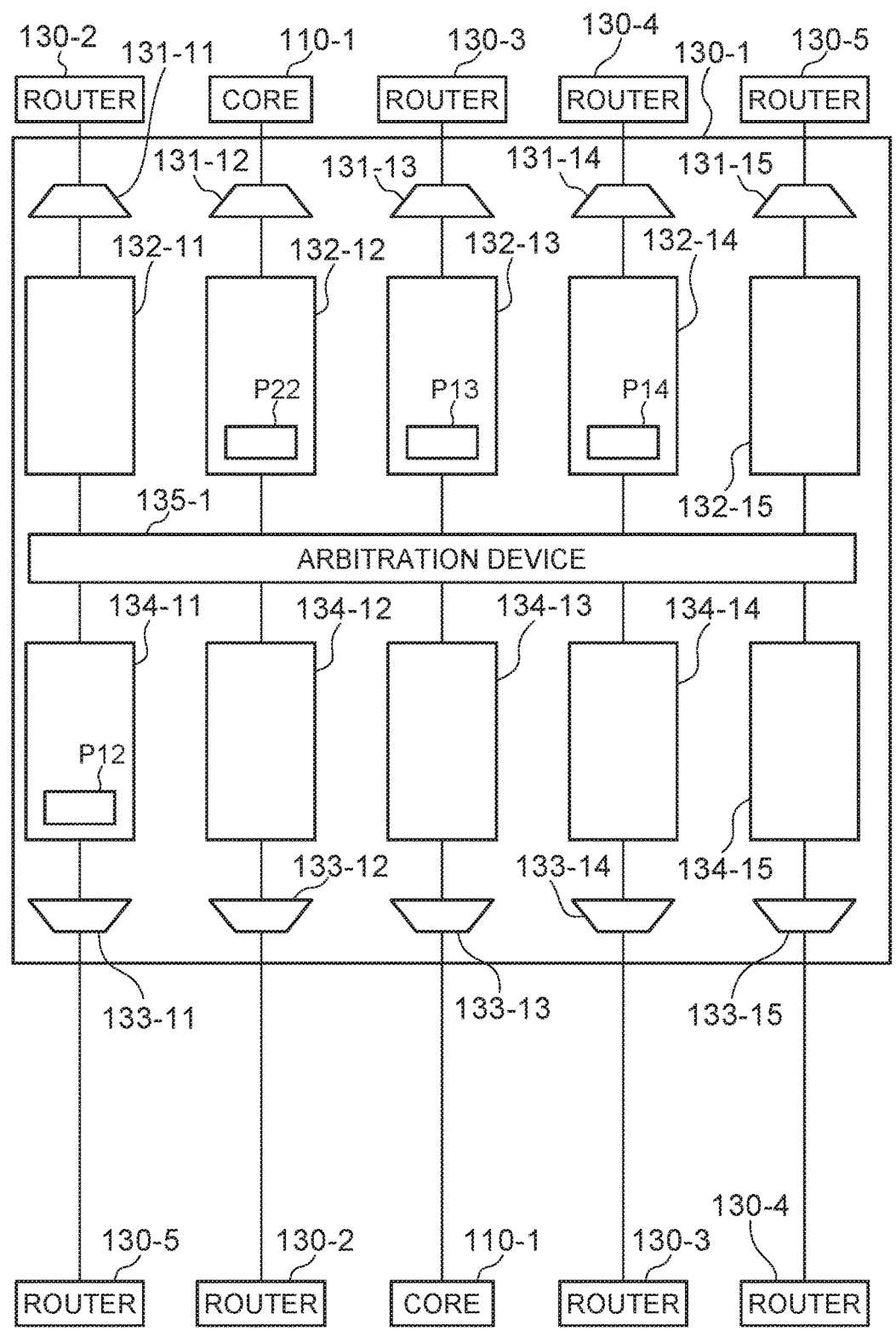
FIG. 22 illustrates an exemplary operation of a router according to the first exemplary embodiment of the present invention.

Next, the router 130-1 moves the focus to the input port 131-12 according to the round robin system. The router 130-1 then focuses on the oldest packet P12 stored in the input buffer 132-12 corresponding to the input port 131-12. As the destination (memory 120-1) of the packet P12 and the destination (core 110-2) of the packet P21 previously transferred to the output buffer 134-11 corresponding to the destination of the packet P12 do not match and there is a space in the output buffer 134-11, the router 130-1 transfers the packet P12 from the input buffer 132-12 to the output buffer 134-11 as illustrated in FIG. 22. The packet P12 stored in the output buffer 134-11 is transmitted to the router 130-5 via the output port 133-11. When a space is generated in the input buffer 132-12 of the router 130-1 due to the transfer of the packet P12, the packet P22 transmitted from the core 110-1 is stored in the input buffer 132-12 via the input port 131-12, as illustrated in FIG. 22. Then, the router 130-1 stores the destination (memory 120-1) of the packet P12 in the destination storage region 138, in association with the output buffer 134-11.

After that, a process similar to that described above is repeated by the router 130-1. Thereby, the packets P11, P21, P12, P22, P13, P23, P14, and P24 are finally transmitted in this order from the router 130-1 to the router 130-5. This means that the packets having the same destinations are not transmitted consecutively from the router 13-1 to the router 130-5. Accordingly, when transfer waiting occurs between the router 130-5 and a module connected with the router 130-5, as packets having the same destination are not stored consecutively in the input buffer of the router 130-5, it is possible to transfer packets having a destination that is a module with no transfer waiting. As a result, buffer resources of the router 130 can be used effectively, which improves throughput and latency.

Next, description will be given on the operation of the router 130-5 when packets are transmitted from the router 130-1 to the router 130-5 in the packet order described above, with reference to FIGS. 23 to 26. It should be noted that every buffer is empty at the time of inputting the first packet P11. Further, transfer waiting occurs temporarily between the router 130-5 and the memory 120-1.

Figure 23:
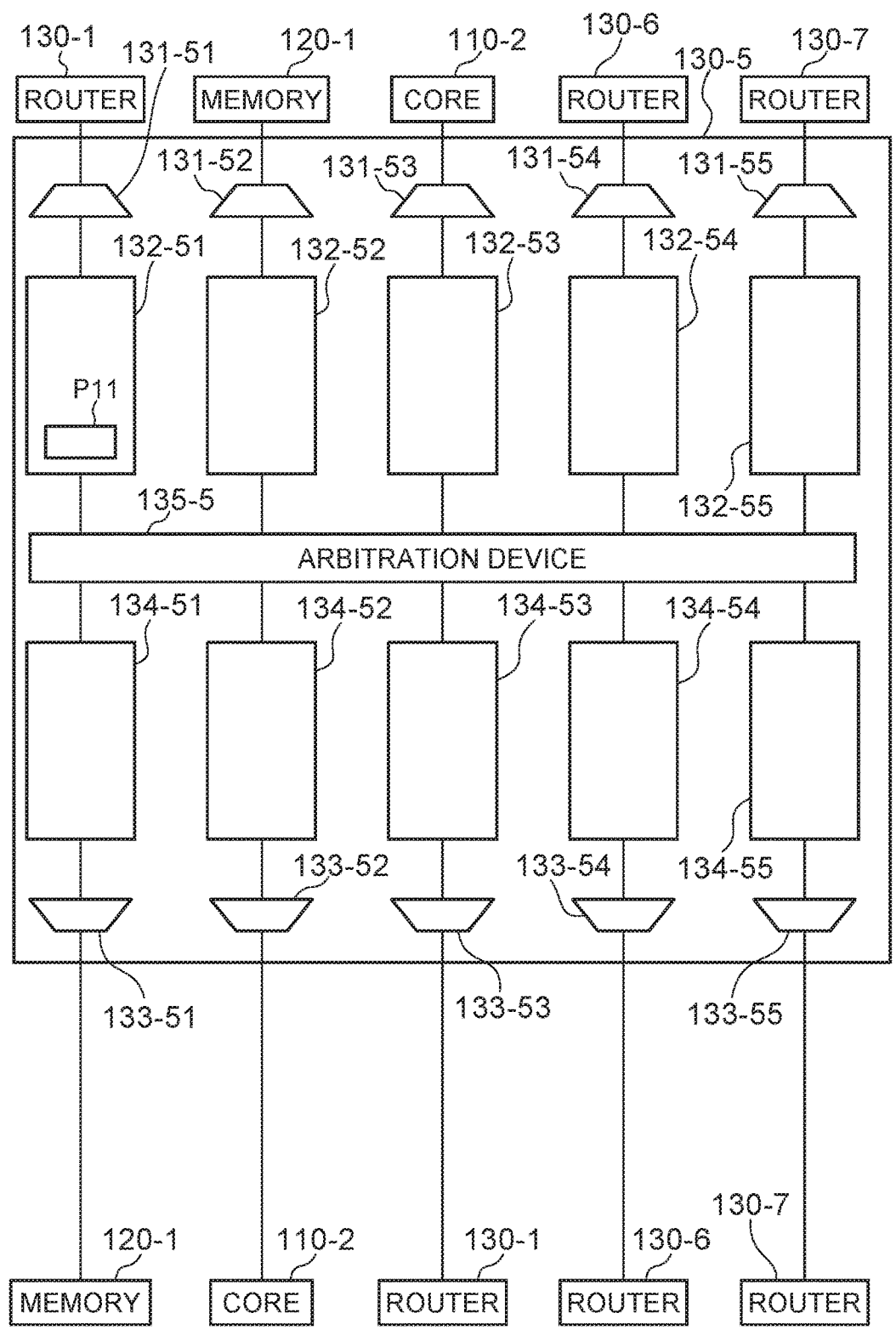
FIG. 23 illustrates an exemplary operation of a router according to the first exemplary embodiment of the present invention.
Figure 24:
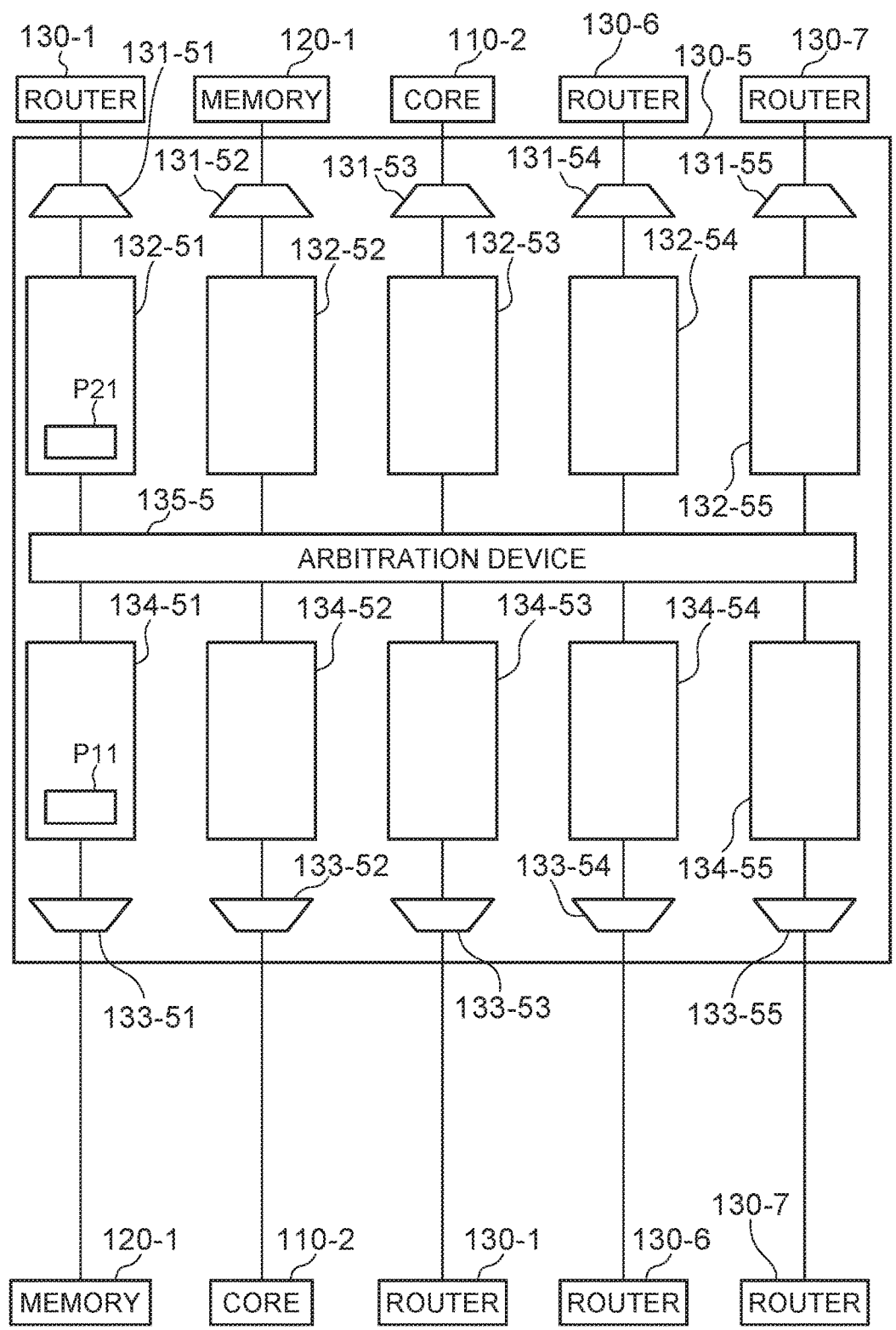
FIG. 24 illustrates an exemplary operation of a router according to the first exemplary embodiment of the present invention.

As illustrated in FIG. 23, the router 130-1 receives the packet P11 from the router 130-1 via the input port 131-51, and stores it in the input buffer 132-51. Next, the router 130-5 focuses on the input port 131-51. The router 130-5 then focuses on the oldest packet P11 stored in the input buffer 132-51 corresponding to the input port 131-51. As the destination (memory 120-1) of the packet P11 is a module adjacent to the router 130-5 and there is a space in the output buffer 134-51 corresponding to the destination thereof, the router 130-5 transfers the packet P11 from the input buffer 132-51 to the output buffer 134-51 as illustrated in FIG. 24. The packet P11 stored in the output buffer 134-51 is about to be transmitted to the memory 120-1 via the output port 133-51. However, as transfer waiting occurs between the router 130-5 and the memory 120-1, transmission is retained. Accordingly, the packet P11 remains in the output buffer 134-51 until the transfer waiting is solved. When a space is generated in the input buffer 132-51 of the router 130-5 due to the transfer of the packets P11, the packet P21 transmitted from the router 130-1 is stored in the input buffer 132-51 via the input port 131-51, as illustrated in FIG. 24.

Figure 25:
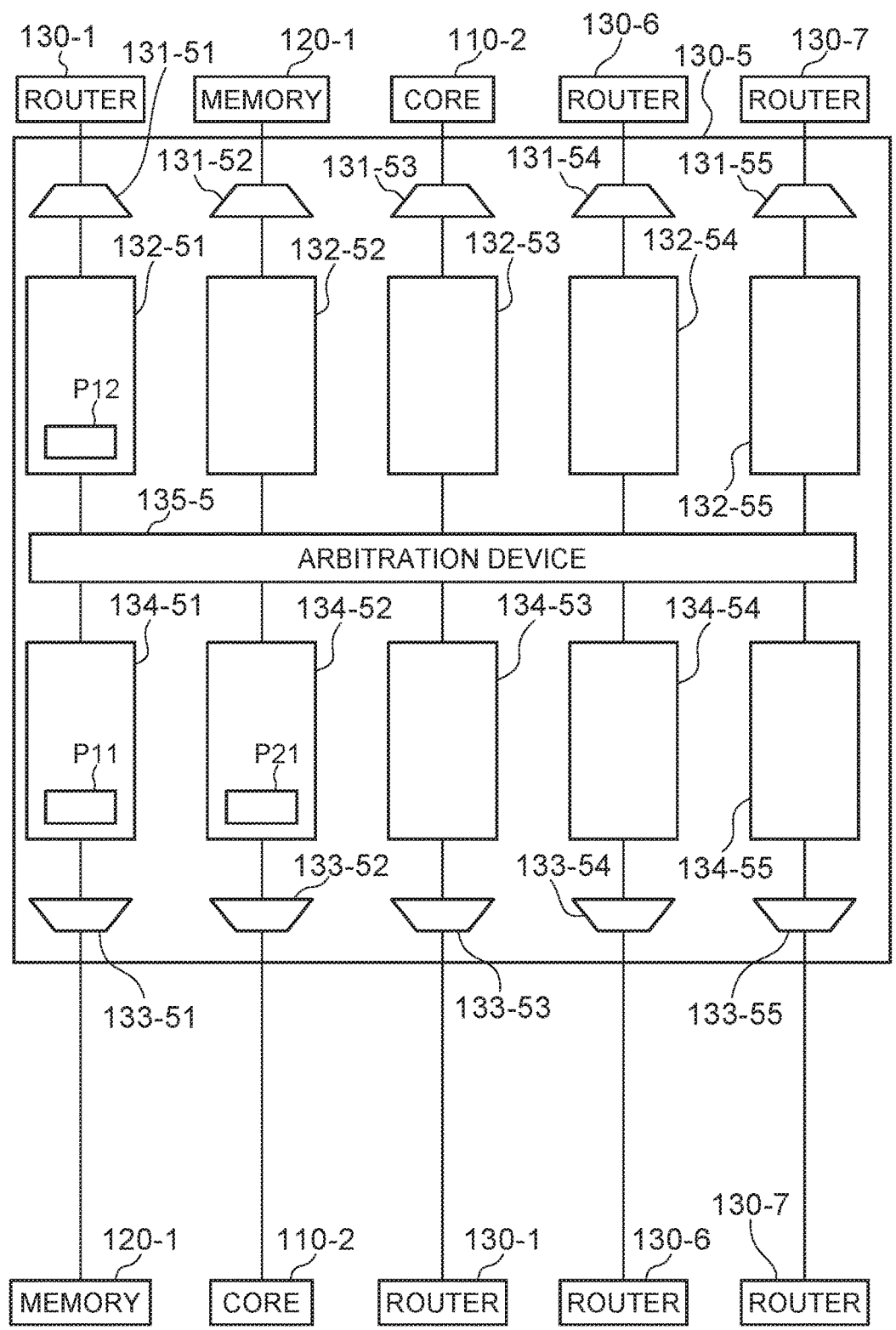
FIG. 25 illustrates an exemplary operation of a router according to the first exemplary embodiment of the present invention.

Next, the router 130-5 moves the focus to the input port 131-52, the input port 131-53, the input port 131-54, and the input port 131-55 in this order, according to the round robin system. As the input buffers 132-52 to 132-55 corresponding to the input ports 131-52 to 131-55 are empty, the router 130-1 moves the focus to the input port 131-51 again according to the round robin system. Next, the router 130-5 focuses on the oldest packet P21 stored in the input buffer 132-51 corresponding to the input port 131-51. As the destination (core 110-2) of the packet P21 is a module adjacent to the router 130-5 and there is a space in the output buffer 134-52 corresponding to the destination, the router 130-5 transfers the packet P21 from the input buffer 132-51 to the output buffer 134-52 as illustrated in FIG. 25. The packet P21 stored in the output buffer 134-52 is transmitted to the core 110-2 via the output port 133-52. When a space is generated in the input buffer 132-51 of the router 130-5 due to the transfer of the packets P21, the packets P12 transmitted from the router 130-1 is stored in the input buffer 132-51 via the input port 131-51, as illustrated in FIG. 25.

As illustrated in FIG. 25, when the input buffer 132-51 is occupied by the packet P12 in which the destination thereof is the memory 120-1 and there is no space in the output buffer 134-51 corresponding to the destination thereof, the router 130-5 cannot receive the following packets any more from the router 130-1. However, the router 130-5 received three packets in total, namely P11, P21, and P12, from the router 130-1 until it cannot receive the following packets any more from the router 130-1, and the router 130-5 transmitted one packet P21 among them to the destination core 110-2.

Figure 26:
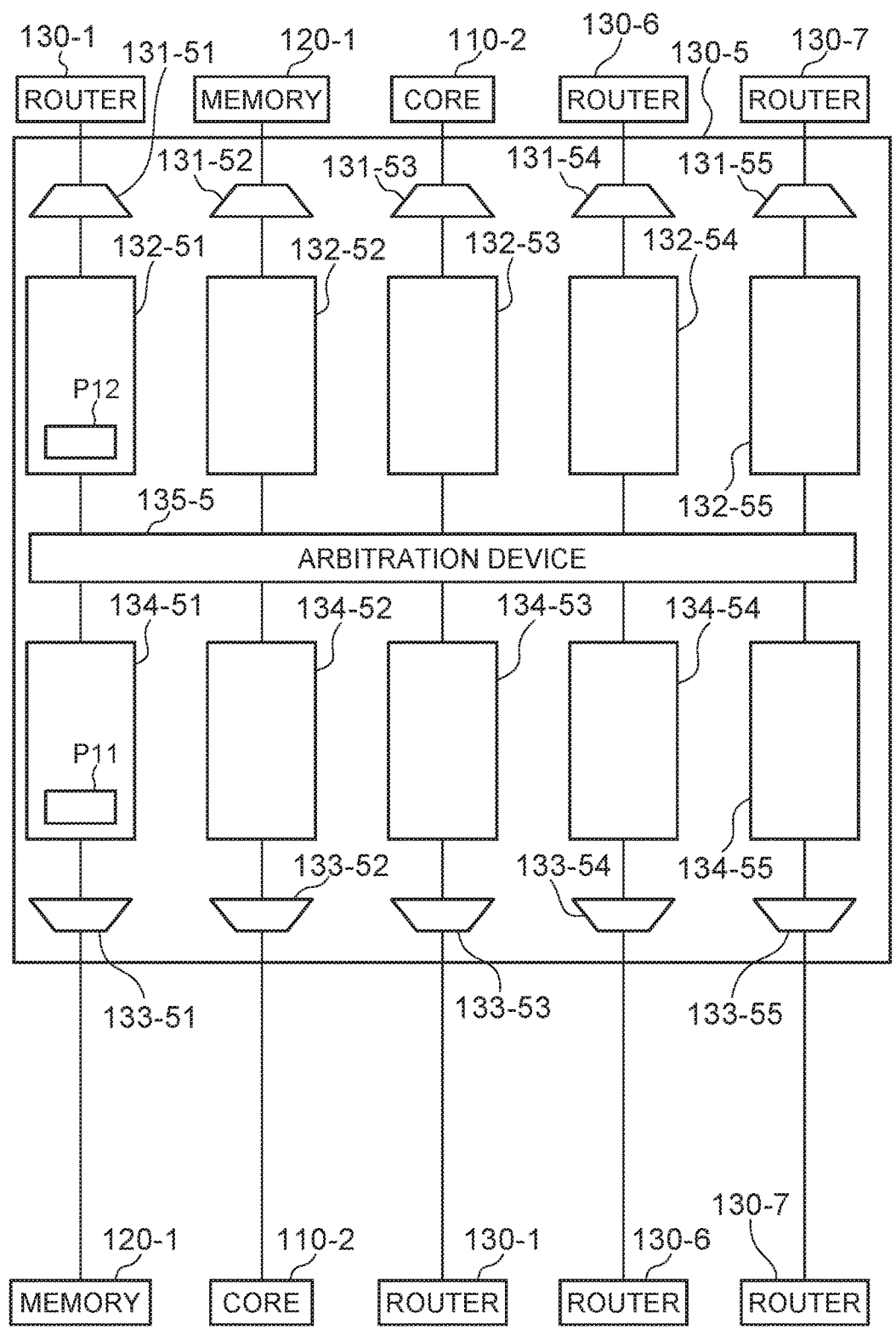
FIG. 26 illustrates an exemplary operation of a router according to the first exemplary embodiment of the present invention.

Meanwhile, in the case where the router 130-5 consecutively receives the packets P11 and P12 in which the destinations thereof are the same from the router 130-1, at the time when the packet P11 is stored in the output buffer 134-51 and the packet P12 is stored in the input buffer 132-51 as illustrated in FIG. 26, the router 130-5 becomes unable to receive the following packets from the router 130-1. Until such a state, the router 130-5 received only two packets P11 and P12 from the router 130-1, and could not transmit any packet to the core 110-2.

[Second Exemplary Embodiment]

Figure 27:
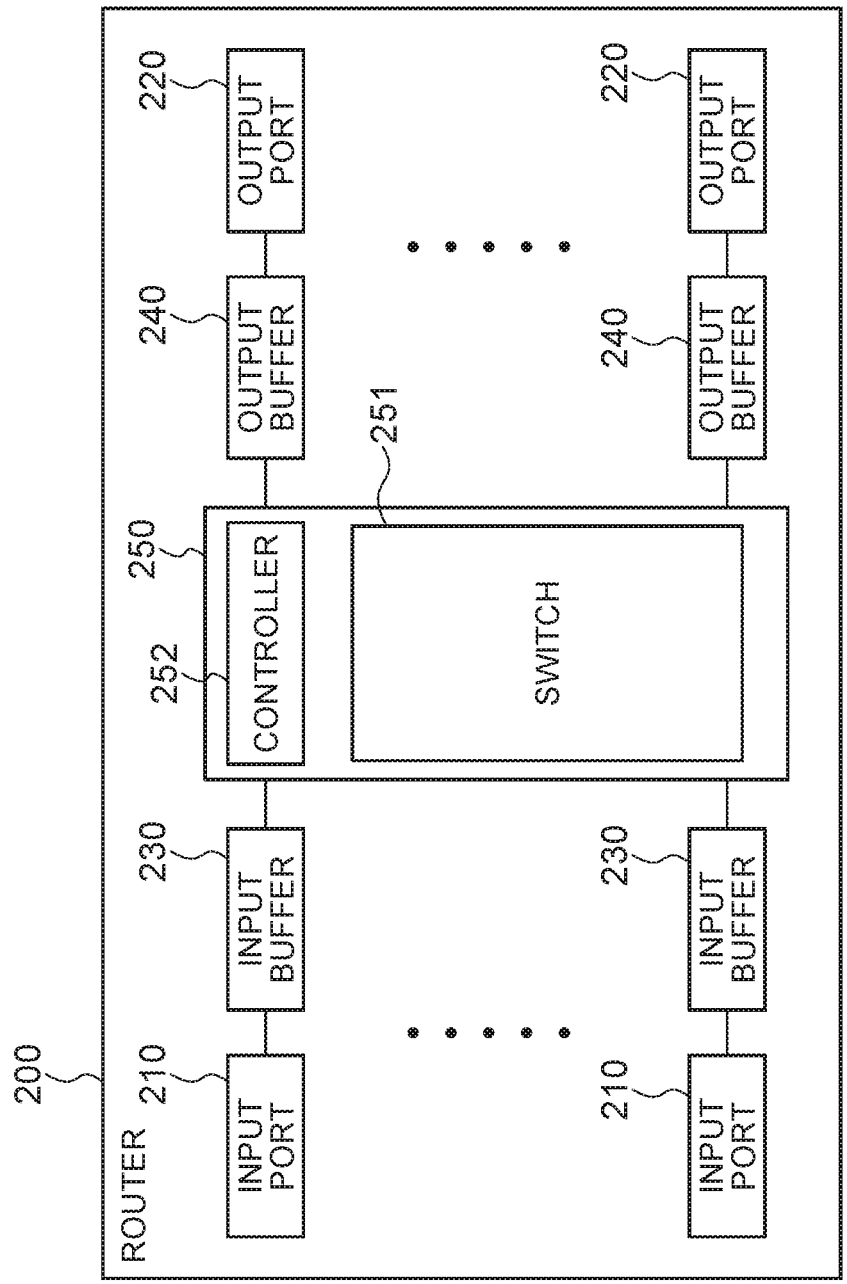
FIG. 27 illustrates an exemplary configuration of a router according to a second exemplary embodiment of the present invention.

FIG. 27 illustrates an exemplary configuration of a router 200 according to a second exemplary embodiment of the present invention. With reference to FIG. 27, the router 200 is configured to include a plurality of input ports 210, a plurality of output ports 220, a plurality of input buffers 230, a plurality of output buffers 240, and an arbitration unit 250.

The input ports 210 are provided one to one to modules connected with the router 200. The modules connected with the router 200 may be a memory, a processor core, a router, and the like. The input buffers 230 are provided one to one to the input ports 210. The input buffer 230 has a buffer having a capacity of storing at least one packet. The input buffer 230 stores a packet input from the corresponding input port 210.

The output ports 220 are provided one to one to modules connected with the router 200. The output buffers 240 are provided one to one to the output ports 220. The output buffer 240 has a buffer having a capacity of storing at least one packet. The output buffer 240 stores a packet output from the corresponding output port 220.

The arbitration unit 250 is connected with the input buffers 230 and the output buffers 240. The arbitration unit 250 transfers packets from the input buffers 230 to the output buffers 240. The arbitration unit 250 determines packets to be transferred next from the input buffers 230 to the output buffers 240, based on a result of comparison between the destination of the transferred packet previously transferred to the output buffer 240 corresponding to the destination of the packet in the input buffer 230 and the destination of the packet in the input buffer 230.

In more detail, the arbitration unit 250 includes a switch 251 and a controller 252. The switch 251 is connected between the input buffers 230 and the output buffers 240, and supplies a path from an arbitrary input buffer 230 to an arbitrary output buffer 240. The controller 252 controls the switch 251 to transfer packets from the input buffers 230 to the output buffers 240 via the switch 251. For example, the controller 252 selects any of the input buffers 230, and acquires a packet from the selected input buffer. Then, the controller 252 determines propriety of transmission of the acquired packet to the output buffer 240, based on a result of comparison between the destination of the packet previously transferred to the output buffer 240 corresponding to the destination of the acquired packet and the destination of the acquired packet, and the availability of the output buffer 240. Then, the controller 252 controls the switch 251 to transfer the packet determined to be transferable, from the input buffer 230 to the output buffer 240.

The router 200 configured as described above functions as described below. First, the input ports 210 receive packets. Next, the input buffers 230 store packets input from the input ports 210. Then, the arbitration unit 250 transfers the packets from the input buffers 230 to the output buffers 240. At that time, the arbitration unit 250 determines packets to be transferred next from the input buffers 230 to the output buffers 240, based on a result of comparison between the destinations of the transferred packets previously transferred to the output buffers 240 corresponding to the destinations of the packets in the input buffers 230 and the destinations of the packets in the input buffers 230. Then, the output buffers 240 store the transferred packets therein. Then, the output ports 220 output the packets stored in the output buffers 240 to a memory, a processor core, a router, and the like that are adjacent thereto.

According to the router 200 configured as described above, the transmission performance of the router 200 can be improved regardless of the number of buffers of the input buffers 230 and the output buffers 240. This is because the arbitration unit 250 determines packets to be transferred next from the input buffers 230 to the output buffers 240, based on a result of comparison between the destinations of the transferred packets previously transferred to the output buffers 240 corresponding to the destinations of the packets in the input buffers 230 and the destinations of the packets in the input buffers 230. Accordingly, it is possible to prevent a plurality of packets having the same destination from being transmitted consecutively from the respective output ports 220 of the router 200. Therefore, in the next router 200 connected with the router 200, it is possible to prevent a plurality of packets having the same destination from being input to an input buffer consecutively via an input port.

While the present invention has been described with reference to the exemplary embodiments described above, the present invention is not limited to the above-described embodiments. The form and details of the present invention can be changed within the scope of the present invention in various manners that can be understood by those skilled in the art.

For example, a controller of an arbitration unit may be configured that when the controller detects that only one or more packets having destinations matching the destination of the transferred packet previously transferred to the output buffer exist in the input buffers, the controller determines a packet to be transferred next from among the one or more packets having the destinations matching the destination of the transferred packet previously transferred to the output buffer, for example.

The present invention is applicable to a network-on-chip having global latency and fairness of throughput such as a vector processor, a GPU, or the like, and a router (repeater) on a network-on-chip.

REFERENCE SIGNS LIST

100 LSI chip
110 core
120 memory
130 router
131 input port
132 input buffer
133 output port
134 output buffer
135 arbitration device
136 crossbar switch
137 controller
138 destination storage region
140 transmission line
150 transmission line
160 transmission line
200 router
210 input port
220 output port
230 input buffer
240 output buffer
250 arbitration unit
251 switch
252 controller

The invention claimed is:

1. A repeater comprising:
   a plurality of input ports for inputting packets from a plurality of modules;
   a plurality of input buffers configured to store the packets input from the input ports;
   a plurality of output ports for outputting packets to the modules;
   a plurality of output buffers configured to store the packets before output from the output ports;
   a switch connected between the input buffers and the output buffers;
   a destination storage region for each of the output buffers, the destination storage region being a region in which a destination of each of the packets transferred from each of the input buffers to each of the output buffers is stored; and
   a controller, the controller being configured to select any of the input buffers, acquire any of the packets from the selected input buffer, and based on a result of comparison between the destination of the packet stored in the destination storage region corresponding to the output buffer corresponding to a destination of the acquired packet and the destination of the acquired packet and on availability of the output buffer, determine propriety of transfer of the acquired packet to the output buffer, control the switch to transfer the packet determined to be transferable, from the input buffer to the output buffer, and store the destination of the transferred packet in the destination storage region corresponding to the output buffer of a transfer destination.

2. The repeater according to claim 1, wherein the controller selects the input buffer from which the packet is acquired, from among the plurality of the input buffers based on round robin.

3. The repeater according to claim 1, wherein the controller acquires the packet from the selected input buffer based on a time that the packet is stored in the input buffer.

4. The repeater according to claim 1, wherein the output port acquires the packet from the output buffer based on a time that the packet is stored in the output buffer, and outputs the acquired packet to the module.

5. The repeater according to claim 1, wherein when destinations of all of the packets stored in the plurality of the input buffers match the destination of the packet previously transferred to the output buffer corresponding to the destinations, the controller determines a packet to be transferred to the output buffer from among the packets stored in the plurality of the input buffers, based on the availability of the output buffer.

6. A network-on-chip device comprising:
a plurality of repeaters;
a plurality of modules; and
a plurality of transmission lines connecting two of the repeaters adjacent to each other and connecting the repeater and the module adjacent to the repeater, wherein
each of the repeaters includes:
a plurality of input ports for inputting packets from a plurality of adjacent modules;
a plurality of input buffers configured to store the packets input from the input ports;
a plurality of output ports for outputting packets to adjacent modules;
a plurality of output buffers configured to store the packets before output from the output ports;
a switch connected between the input buffers and the output buffers;
a destination storage region for each of the output buffers, the destination storage region being a region in which a destination of each of the packets transferred from each of the input buffers to each of the output buffers is stored; and
a controller, the controller being configured to select any of the input buffers, acquire any of the packets from the selected input buffer, and based on a result of comparison between the destination of the packet stored in the destination storage region corresponding to the output buffer corresponding to a destination of the acquired packet and the destination of the acquired packet and on availability of the output buffer, determine propriety of transfer of the acquired packet to the output buffer, control the switch to transfer the packet determined to be transferable, from the input buffer to the output buffer, and store the destination of the transferred packet in the destination storage region corresponding to the output buffer of a transfer destination.

7. A repeating method of inputting a plurality of packets from a plurality of modules via a plurality of input ports and outputting the plurality of the packets to the plurality of the modules via a plurality of output ports, the method comprising:
inputting the plurality of the packets from the plurality of the input ports and storing the packets in a plurality of input buffers;
selecting any of the input buffers;
acquiring any of the packets from the selected input buffer;
based on a result of comparison between a destination of a packet stored in a destination storage region corresponding to an output buffer corresponding to a destination of the acquired packet, among destination storage regions for respective output buffers, and the destination of the acquired packet, each of the destination storage regions being a region in which a destination of each of the packets transferred from each of the input buffers to each of the output buffers is stored, and based on availability of the output buffer, determining propriety of transfer of the acquired packet to the output buffer;
transferring the packet determined to be transferable, from the input buffer to the output buffer via a switch connected between the input buffers and the output buffers;
storing the destination of the transferred packet in the destination storage region corresponding to the output buffer of a transfer destination; and
acquiring the packet from the output buffer, and outputting the packet to the module via the output port.

8. The repeating method according to claim 7, wherein the selecting the input buffer is performed based on round robin.

9. The repeating method according to claim 7, wherein the acquiring the packet from the selected input buffer is performed based on a time that the packet is stored in the input buffer.

10. The repeating method according to claim 7, wherein the acquiring the packet from the output buffer is performed based on a time that the packet is stored in the output buffer.

11. The repeating method according to claim 7, further comprising
when destinations of all of the packets stored in the plurality of the input buffers match the destination of the packet previously transferred to the output buffer corresponding to the destinations, determining a packet to be transferred to the output buffer from among the packets stored in the plurality of the input buffers, based on the availability of the output buffer.

* * * * *